United States Patent
Oshima et al.

(10) Patent No.: US 9,001,497 B2
(45) Date of Patent: Apr. 7, 2015

(54) ELECTRODE FOIL AND CAPACITOR USING SAME

(75) Inventors: Akiyoshi Oshima, Osaka (JP); Hiroki Kamiguchi, Osaka (JP); Masashi Shoji, Kyoto (JP); Hitoshi Ishimoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 172 days.

(21) Appl. No.: 13/394,668

(22) PCT Filed: Mar. 14, 2011

(86) PCT No.: PCT/JP2011/001451
§ 371 (c)(1),
(2), (4) Date: Mar. 7, 2012

(87) PCT Pub. No.: WO2011/114680
PCT Pub. Date: Sep. 22, 2011

(65) Prior Publication Data
US 2012/0170173 A1 Jul. 5, 2012

(30) Foreign Application Priority Data

| Mar. 16, 2010 | (JP) | 2010-059052 |
| Mar. 30, 2010 | (JP) | 2010-078448 |
| May 26, 2010 | (JP) | 2010-120016 |
| Dec. 15, 2010 | (JP) | 2010-278785 |
| Dec. 15, 2010 | (JP) | 2010-278786 |

(51) Int. Cl.
*H01G 9/00* (2006.01)
*H01G 4/32* (2006.01)
*H01G 9/04* (2006.01)
*H01G 9/055* (2006.01)

(52) U.S. Cl.
CPC . *H01G 9/04* (2013.01); *H01G 9/055* (2013.01)

(58) Field of Classification Search
USPC .................................. 361/523, 301.5, 511
See application file for complete search history.

(56) References Cited

U.S. PATENT DOCUMENTS 4,970,626 A * 11/1990 Kakinoki et al. ............. 361/512
6,206,065 B1  3/2001 Robbie et al.
(Continued)

FOREIGN PATENT DOCUMENTS

DE  4127743 A1  3/1993
JP  57-158352   9/1982
(Continued)

OTHER PUBLICATIONS

International Search Report issued in International Patent Application No. PCT/JP2011/001451 dated Jun. 14, 2011.
(Continued)

*Primary Examiner* — Eric Thomas
*Assistant Examiner* — Arun Ramaswamy
(74) *Attorney, Agent, or Firm* — McDermott Will & Emery LLP

(57) ABSTRACT

An electrode foil includes a substrate and a coarse film layer having a void therein and formed on the substrate. The coarse film layer includes at least a first coarse film layer formed on the substrate. The first coarse film layer is composed of arrayed first columnar bodies. Each of the first columnar bodies is composed of metallic microparticles stacked on a surface of the substrate and extending in a curve from the surface of the substrate.

23 Claims, 18 Drawing Sheets

(56) References Cited

U.S. PATENT DOCUMENTS

| | | |
|---|---|---|
| 7,149,076 B2 | 12/2006 | Yuan et al. |
| 2003/0026064 A1* | 2/2003 | Nakada et al. ............... 361/523 |
| 2009/0207557 A1* | 8/2009 | Nagara et al. ............... 361/504 |
| 2010/0021719 A1 | 1/2010 | Makino et al. |
| 2010/0202102 A1 | 8/2010 | Aoyama et al. |
| 2011/0002088 A1 | 1/2011 | Aoyama et al. |

FOREIGN PATENT DOCUMENTS

| | | |
|---|---|---|
| JP | 59-167009 A | 9/1984 |
| JP | 03-263312 | 11/1991 |
| JP | 03-263312 A | 11/1991 |
| JP | 04-307912 | 10/1992 |
| JP | 4-307912 | 10/1992 |
| JP | 04-340213 | 11/1992 |
| JP | 4-340213 A | 11/1992 |
| JP | 05-047609 | 2/1993 |
| JP | 05047609 A * | 2/1993 |
| JP | 05-275286 A | 10/1993 |
| JP | 02-704023 B2 | 10/1997 |
| JP | 03-168587 B2 | 3/2001 |
| JP | 2005-101279 A | 4/2005 |
| JP | 2007-123814 | 5/2007 |
| JP | 2007-208254 | 8/2007 |
| JP | 2008-258404 | 10/2008 |
| JP | 2008258404 A * | 10/2008 |
| JP | 2008-288295 | 11/2008 |
| JP | 2008-288296 | 11/2008 |
| WO | 2009/060563 A1 | 5/2009 |
| WO | 2010-029598 A1 | 3/2010 |

OTHER PUBLICATIONS

Partial Supplementary European Search Report dated Jan. 9, 2015, issued in related European Patent Application No. 11755873.4.

* cited by examiner

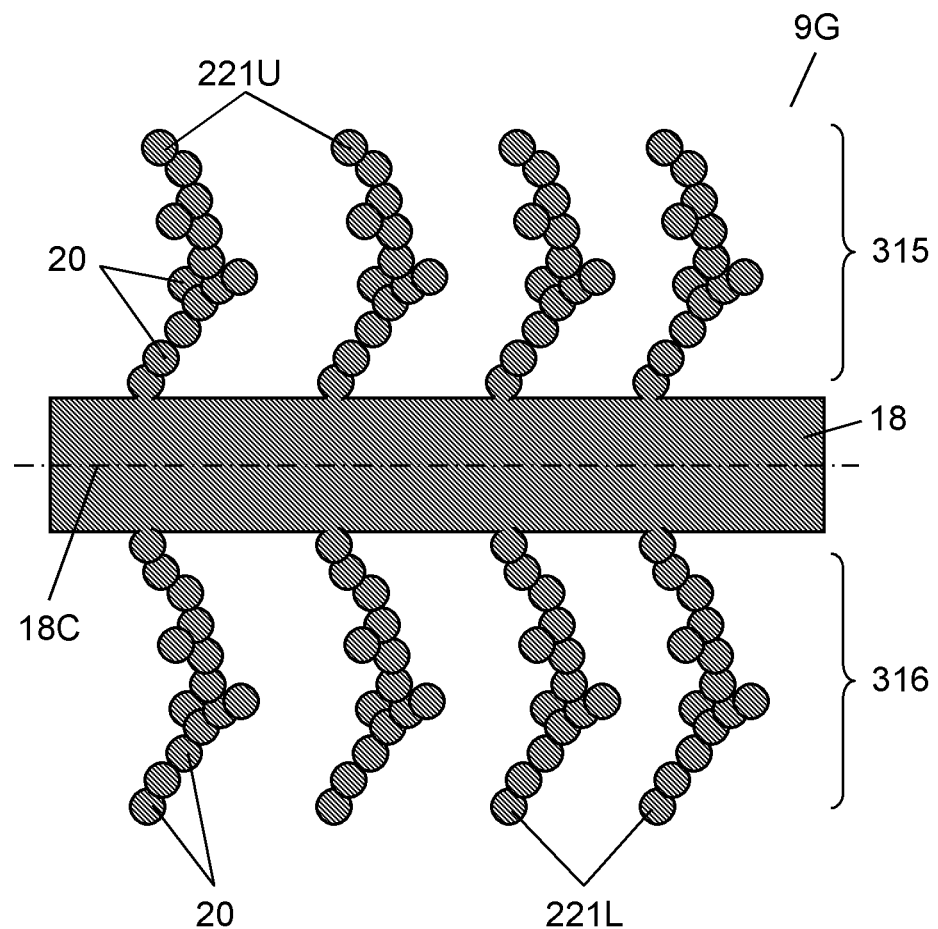

ELECTRODE FOIL AND CAPACITOR USING SAME

RELATED APPLICATIONS

This application is the U.S. National Phase under 35 U.S.C. §371 of International Application No. PCT/JP2011/001451, filed on Mar. 14, 2011, which in turn claims the benefit of Japanese Application Nos. 2010-059052 filed on Mar. 16, 2010, 2010-078448 filed on Mar. 30, 2010, 2010-120016 filed on May 26, 2010, 2010-278785 filed on Dec. 15, 2010, and 2010-278786 filed on Dec. 15, 2010, the disclosures of which Applications are incorporated by reference herein.

TECHNICAL FIELD

The present invention relates to an electrode foil and a capacitor using same.

BACKGROUND ART

A solid electrolytic capacitor having a low ESR is used around a CPU of a personal computer. An aluminum electrolytic capacitor is used for smoothing in a power circuit, and the like. In the capacitors, there is a strong demand for miniaturization and having a large capacitance (capacity).

The conventional solid electrolytic capacitor includes an electrode foil (positive electrode foil) on which a dielectric film is formed, a solid electrolytic layer made of a conductive polymer formed on the dielectric film, and a negative electrode layer formed on the solid electrolytic layer. Recently, as illustrated in FIG. 21, electrode foil 3 including substrate 1 composed of a valve action metal foil and coarse film layer 2 including a void therein and formed on substrate 1 by evaporation is studied in order to increase the capacitance of the capacitor (for example, PTL 1).

Coarse film layer 2 is formed as an aggregation of tree-shaped or sea-grape-shaped columnar bodies 5 in each of which metallic microparticles 4 are stacked on the surface of substrate 1 and extend from the surface of substrate 1. As metallic microparticles 4 are stacked, a surface area of coarse film layer 2 is enlarged and the capacitance of the capacitor in which electrode foil 3 is used is increased.

In order to increase the capacitance of electrode foil 3, the number of stacking times of metallic microparticle 4 may be increased to enlarge the total surface area of coarse film layer 2. However, as the number of stacking times of metallic microparticle 4 is increased, coarse film layer 2 is thickened, which make it hard to miniaturize the capacitor. Sometimes strength of columnar body 5 against a stress load from a perpendicular direction is decreased when a height of columnar body 5 is increased.

When a particle diameter of metallic microparticle 4 is reduced, the total surface area of coarse film layer 2 can be enlarged. However, mechanical strength of coarse film layer 2 is decreased, and electrical insulation is easily generated in a connection portion between metallic microparticles 4, and therefore the reduced particle diameter of metallic microparticle 4 does not contribute to the increase in capacitance of electrode foil 3. As described above, it is difficult to increase the capacitance of electrode foil 3.

CITATION LIST

Patent Literatures

PTL 1: Unexamined Japanese Patent Publication No. 2008-258404

SUMMARY OF THE INVENTION

The present invention is a large-capacitance electrode foil and a capacitor using same. An electrode foil of the present invention includes a substrate and a coarse film layer including a void therein and formed on the substrate. The coarse film layer includes at least a first coarse film layer formed on the substrate. The first coarse film layer is composed of arrayed first columnar bodies. Each of the first columnar bodies is composed of metallic microparticles stacked on a surface of the substrate and extending in a curve from the surface of the substrate. Therefore, the capacitance of the electrode foil can further be increased.

BRIEF DESCRIPTION OF DRAWINGS

FIG. 11 is a schematic sectional view illustrating an electrode foil according to a fourth exemplary embodiment of the invention.

DESCRIPTION OF EMBODIMENTS

First Exemplary Embodiment

An electrode foil according to a first exemplary embodiment of the invention and a capacitor in which the electrode foil is used will be described below. The capacitor of the exemplary embodiment is a stacked type solid electrolytic capacitor in which a conductive polymer material is used as a negative electrode material.

Figure 1:
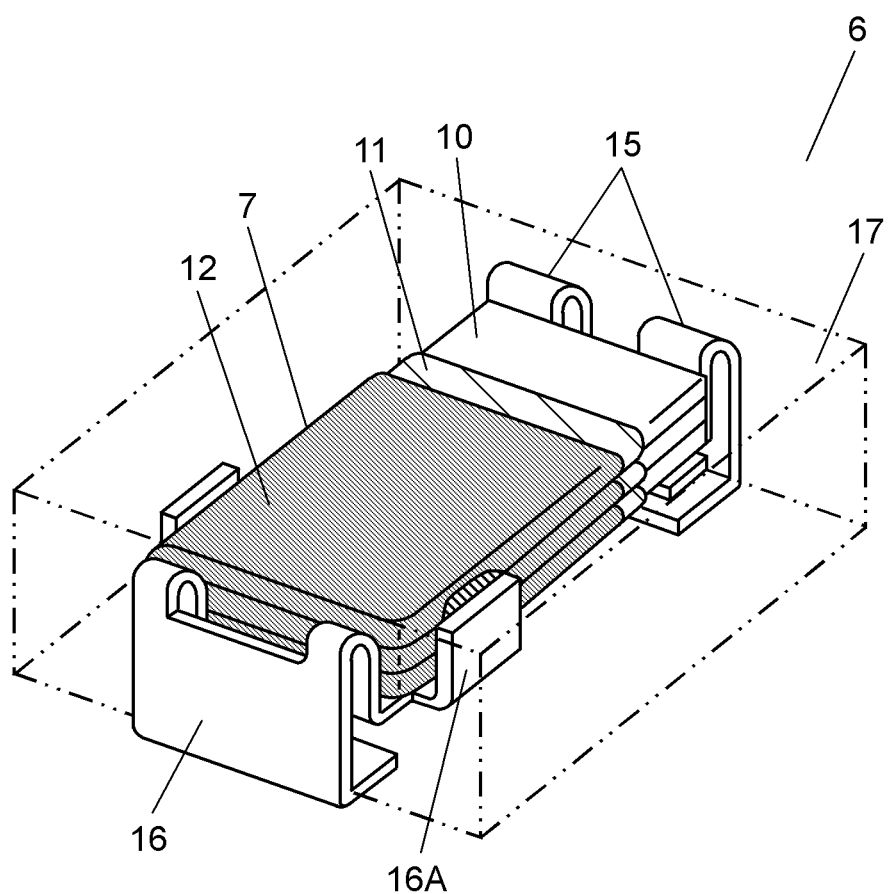
FIG. 1 is a perspective view illustrating a capacitor according to a first exemplary embodiment of the invention.
Figure 2A:
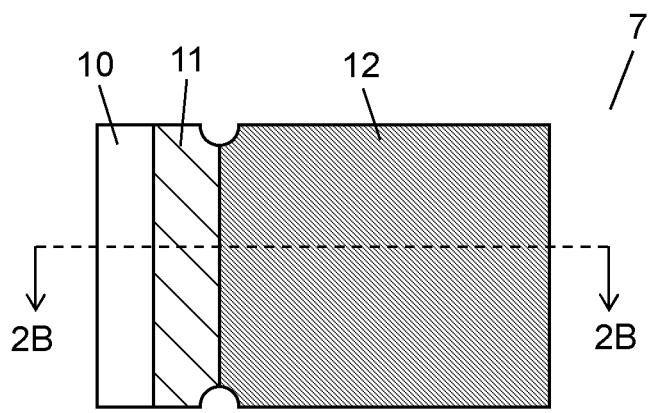
FIG. 2A is a plan view illustrating a capacitor element used in the capacitor in FIG. 1.
Figure 2B:
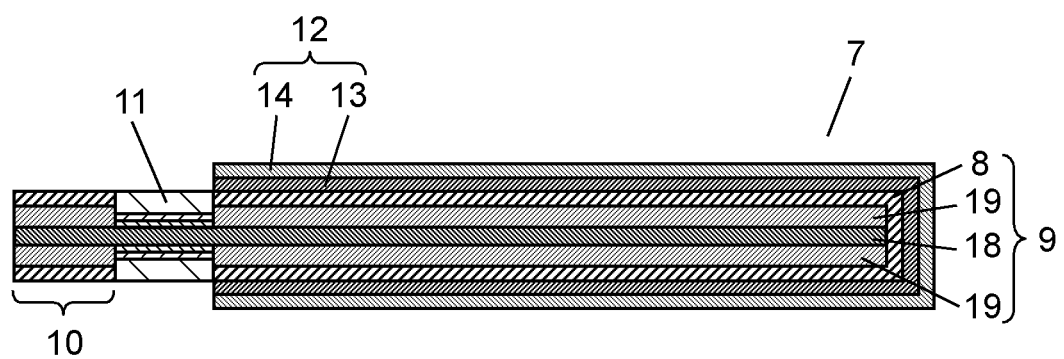
FIG. 2B is a sectional view taken on a line 2B-2B of the capacitor element in FIG. 2A.

FIG. 1 is a perspective view illustrating capacitor 6 of the present exemplary embodiment. Capacitor 6 is formed of stacked rectangular capacitor elements 7. FIGS. 2A and 2B are a plan view and a sectional view of capacitor element 7. Capacitor 6 includes capacitor element 7 and outer package 17.

As illustrated in FIG. 2B, capacitor element 7 includes electrode foil (positive electrode foil) 9 on which dielectric film 8 is formed, solid electrolytic layer 13 formed on dielectric film 8, and negative electrode layer 14 formed on solid electrolytic layer 13. Capacitor element 7 also includes an electrically insulating resist portion 11. Resist portion 11 is provided so as to press electrode foil 9 after dielectric film 8 is formed, and separates electrode foil 9 into positive electrode portion 10 and a negative electrode forming portion. Solid electrolytic layer 13 is made of a conductive polymer. Negative electrode layer 14 is composed of a carbon layer and a silver paste layer. Solid electrolytic layer 13 and negative electrode layer 14 constitute negative electrode portion 12 formed on dielectric film 8 of the negative electrode forming portion.

As illustrated in FIG. 1, capacitor 6 includes capacitor elements 7, positive electrode terminal 15, negative electrode terminal 16, and outer package 17. Capacitor elements 7 are stacked, and positive electrode portion 10 of each capacitor element 7 is connected to positive electrode terminal 15 by laser welding. On the other hand, negative electrode terminal 16 is connected to a bottom surface or a side surface of each negative electrode portion 12. Particularly, bent portion 16A in which both side surfaces of an element mounting portion for mounting capacitor element 7 are bent upward is formed in negative electrode terminal 16. The element mounting portion of negative electrode terminal 16 and negative electrode portion 12 of lowermost capacitor element 7 are bonded by a conductive adhesive. Similarly, bent portion 16A and negative electrode portion 12, and negative electrode portions 12 of two capacitor elements 7 vertically adjacent to each other are bonded by conductive adhesives, respectively.

Positive electrode terminal 15, negative electrode terminal 16, and capacitor elements 7 are covered with outer package 17 made of an insulating resin so that positive electrode terminal 15 and negative electrode terminal 16 are partially exposed to an outer surface. The parts of positive electrode terminal 15 and negative electrode terminal 16, which are exposed from outer package 17, are bent to the bottom surface along outer package 17. Therefore, surface mount type capacitor 6 including the positive electrode terminal and the negative electrode terminal in the bottom surface is formed by the working.

Figure 3:
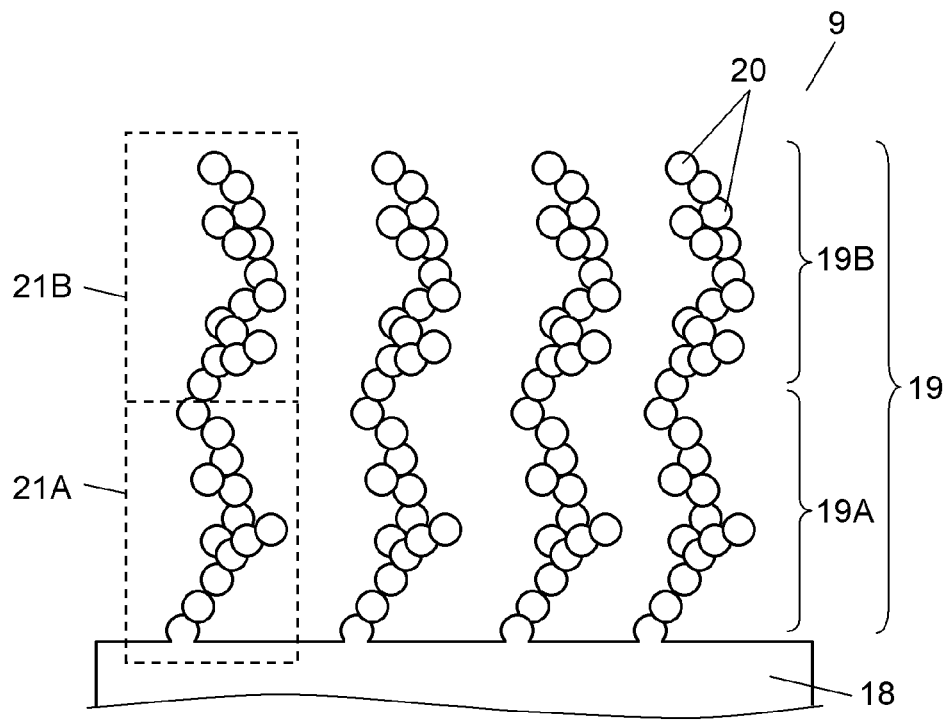
FIG. 3 is a schematic sectional view illustrating an electrode foil of the first exemplary embodiment of the invention.
Figure 4A:
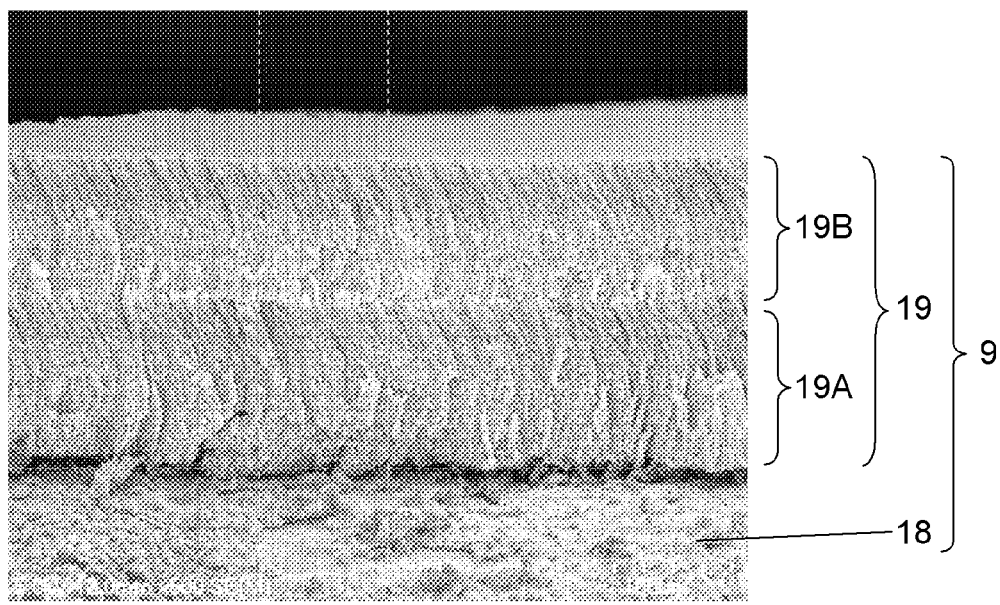
FIG. 4A is a view showing a SEM image in which a section of the electrode foil in FIG. 3 is magnified 500 times.

Electrode foil 9 will be described in detail with reference to FIGS. 2B to 4B. FIG. 3 is a schematic sectional view of electrode foil 9. FIG. 4A is a view showing a SEM image in which a section of the electrode foil in FIG. 3 is magnified 500 times, and FIG. 4B is a schematic diagram of FIG. 4A.

As illustrated in FIG. 2B, electrode foil 9 includes substrate 18 and coarse film layer 19 including a void therein and formed on substrate 18. Coarse film layer 19 may be formed on double sides as illustrated in FIG. 2B or it may be formed on a single side of substrate 18. Dielectric film 8 is formed on coarse film layer 19.

Figure 4B:
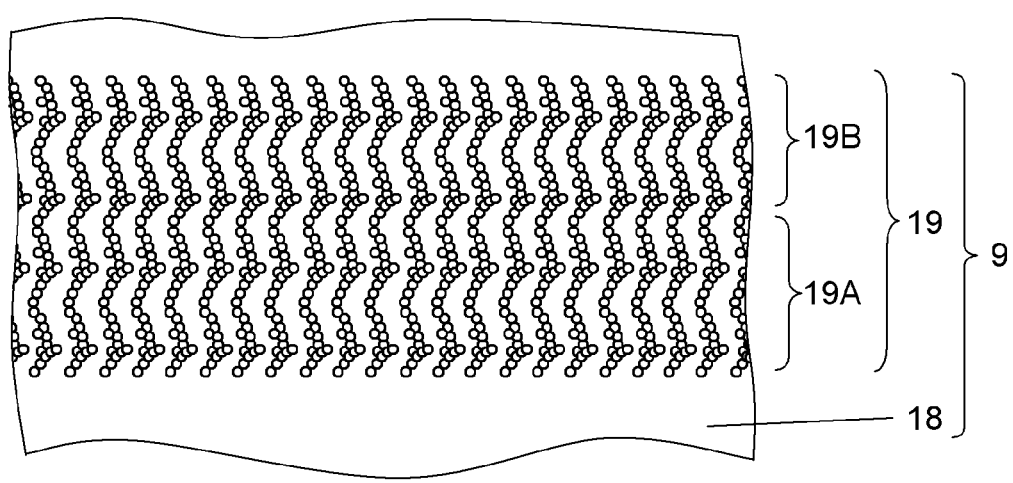
FIG. 4B is a schematic diagram illustrating the SEM image in FIG. 4A.

As illustrated in FIGS. 3 to 4B, coarse film layer 19 has a two-layer structure composed of first coarse film layer 19A formed on substrate 18 and second coarse film layer 19B formed on first coarse film layer 19A. In the present exemplary embodiment, first coarse film layer 19A and second coarse film layer 19B are formed on each of the double sides of substrate 18. Alternatively, coarse film layer 19 may be composed only of first coarse film layer 19A. That is, coarse film layer 19 includes at least first coarse film layer 19A formed on substrate 18. Alternatively, coarse film layer 19 may be composed of three layers or more.

First coarse film layer 19A is composed of arrayed first columnar bodies (hereinafter, referred to as columnar bodies) 21A. Each of columnar bodies 21A is composed of metallic microparticles 20 stacked on a surface of substrate 18 and extending in a curve from the surface of substrate 18. Columnar bodies 21A are curved in parallel to one another in the same direction, and columnar bodies 21A are independent of one another while not intersecting one another.

Second coarse film layer 19B is composed of arrayed second columnar bodies (hereinafter, referred to as columnar bodies) 21B. Each of columnar bodies 21B is composed of metallic microparticles 20 stacked on first coarse film layer 19A and extending in a curve from first coarse film layer 19A. Columnar bodies 21B are curved in parallel to one another in the same direction, and columnar bodies 21B are independent of one another while not intersecting one another.

In columnar bodies 21A and 21B of the present exemplary embodiment, metallic microparticles 20 are stacked from substrate 18 while slightly curved obliquely upward, metallic microparticles 20 are bent near a medium to change an orientation, and metallic microparticles 20 are further stacked in a curve obliquely upward. As described above, columnar bodies 21A and 21B are bent in the medium portion. Alternatively, columnar bodies 21A and 21B may be bent near a base or columnar bodies 21A and 21B may be curved from a leading end side.

As illustrated in FIGS. 3 to 4B, each of columnar bodies 21A and 21B may be formed into a sea-grape shape or a tree shape in which metallic microparticles 20 are irregularly connected and branched. Even if metallic microparticles 20 are irregularly connected and branched, columnar bodies 21A and 21B may be curved as a whole. In columnar bodies 21A and 21B, an original shape is maintained in each of metallic microparticles 20. Columnar bodies 21A and 21B have a group structure so as to be branched. Therefore, compared with a structure in which columnar bodies 21A and 21B are not branched, a surface area can be enlarged, and mechanical strength can be enhanced.

Columnar bodies 21A of first coarse film layer 19A are curved in the same direction. That is, columnar bodies 21A are curved in substantially parallel to one another. Similarly, columnar bodies 21B of second coarse film layer 19B are curved in the same direction.

First coarse film layer 19A and second coarse film layer 19B are curved in the same direction. Accordingly, a perpendicular section of whole coarse film layer 19 relative to substrate 18 has a shape in which M-characters are arrayed in parallel. When the curved direction of first coarse film layer 19A is changed by 180 degrees with respect to that of second coarse film layer 19B, the perpendicular section of coarse film layer 19 has a shape in which S-characters are arrayed. In this case, the capacitance of electrode foil 9 is also increased.

Although not illustrated, in coarse film layers 19 formed on both sides of substrate 18, columnar bodies 21A and 21B are curved in the same direction. That is, coarse film layer 19 formed on the front side of substrate 18 and coarse film layer 19 formed on the backside are substantially symmetrical with respect to substrate 18.

An average particle diameter of metallic microparticles 20 ranges from 0.01 μm to 0.20 μm, inclusive. For example, the average particle diameter can be measured by a SEM photograph of which a horizontal section or a perpendicular section of coarse film layer 19 is taken.

Coarse film layer 19 has many voids, and a mode value of the void diameter ranges 0.01 μm to 0.20 μm, inclusive, substantially same as the average particle diameter of the metallic microparticle 20. The void diameter can be measured by a mercury intrusion technique, and a peak value of a distribution of the measured void diameters is used as the mode value of the void diameter. A porosity of coarse film layer 19 ranges from about 50% to about 80% due to the voids.

For example, substrate 18 has a thickness of 20 μm to 30 μm, first coarse film layer 19A has a thickness of 50 μm, and second coarse film layer 19B has a thickness of 50 μm. Although the thicknesses are not limited to the above values, desirably the sum of thicknesses of first coarse film layer 19A and second coarse film layer 19B is set to 20 μm or more. For the single layer, or for at least two layers, the total thickness on one side of coarse film layer 19 is set to 20 μm or more, which allows the capacitance to be increased.

In the present exemplary embodiment, substrate 18 is made of an aluminum foil. Alternatively, substrate 18 can be made of various conductive materials such as metallic materials including various valve metals such as an aluminum alloy, titanium, niobium, and tantalum and alloy materials thereof. Similarly to substrate 18, metallic microparticle 20 is also made of aluminum. Alternatively, metallic microparticle 20 may be made of another valve metal.

When metallic microparticle 20 and substrate 18 are made of the same material, substrate 18 is properly softened by latent heat in evaporating metallic microparticle 20. Therefore, adhesion between substrate 18 and metallic microparticle 20 can be enhanced while the shape of substrate 18 is maintained. Accordingly, although metallic microparticle 20 may be different from substrate 18 in the material, it is preferable that metallic microparticle 20 is identical to substrate 18 in the material. When metallic microparticle 20 and substrate 18 are made of aluminum, productivity can be enhanced because of a relatively low melting point thereof.

Some parts of metallic microparticles 20 may be made of an oxide or a nitride. That is, coarse film layer 19 may have conductivity as a whole, and some of metallic microparticles 20 may be made of the oxide or the nitride or each metallic microparticle 20 may partially be made of the oxide or the nitride.

When dielectric film 8 is formed by anodization of metallic microparticle 20, dielectric film 8 is made of an aluminum oxide. Alternatively, dielectric film 8 can be made of compounds such as oxides and nitrides of metals such as a zirconium, silicon, tantalum, and niobium by evaporation or sputtering.

Figure 5:
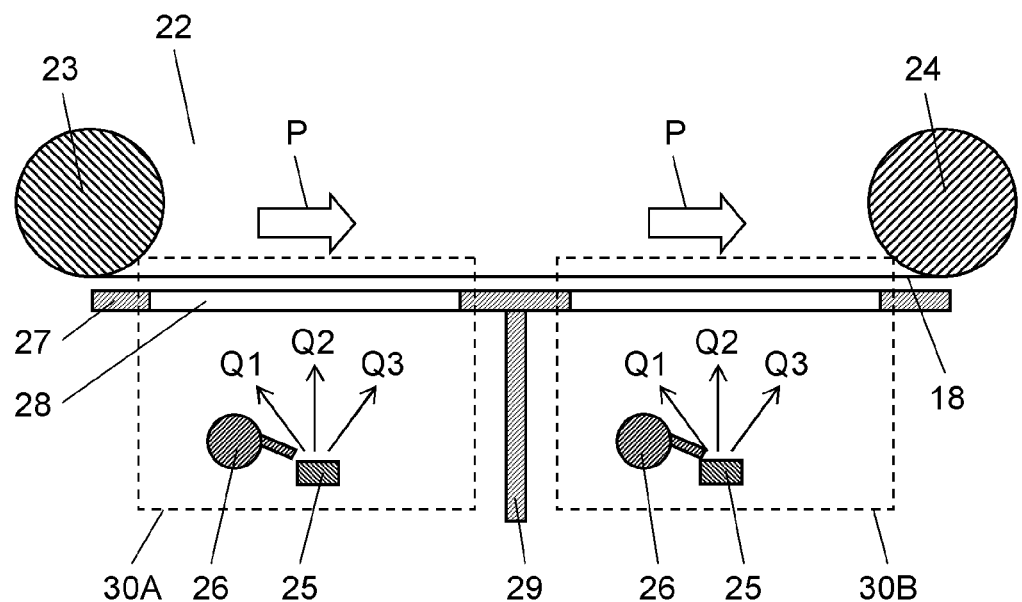
FIG. 5 is a schematic diagram illustrating an electrode foil producing apparatus of the first exemplary embodiment of the invention.

FIG. 5 is a schematic diagram of evaporation apparatus 22 for forming coarse film layer 19. Evaporation apparatus 22 includes delivery roller 23, wind-up roller 24, evaporation boat 25, and supply portion 26. Delivery roller 23 supplies substrate 18. Wind-up roller 24 winds substrate 18 transported from delivery roller 23. Evaporation boat 25 is provided between delivery roller 23 and wind-up roller 24 at a position where boat 25 faces substrate 18. Supply portion 26 supplies an evaporation material to evaporation boat 25. These portions are disposed in a vacuum chamber coupled to a vacuum pump (not illustrated).

Substrate 18 is horizontally transported from delivery roller 23 to wind-up roller 24 in a direction of an arrow P. Both ends of evaporation boat 25 are connected to a power supply (not illustrated), and boat 25 generates heat by resistive heating. Metallic microparticles 20 are evaporated from heat-generating evaporation boat 25, and deposited on the surface of transported substrate 18.

At this point, metallic microparticles 20 are evaporated while substrate 18 is slowly transported in the direction of the arrow P (horizontal direction). Specifically, for example, a feed speed of substrate 18 is about 5 cm/min. The feed speed of substrate 18 is much slower than a feed speed (for example, 500 m/min) of formation of a solid, dense evaporation film that is used for an electrode of a film capacitor. Therefore, metallic microparticles 20 evaporated from evaporation boat 25 toward substrate 18 in an oblique direction Q1, a perpendicular direction Q2, and an oblique direction Q3 are sequentially stacked while the original shape of the particle is maintained. Accordingly, columnar body 21 has a curved structure.

In order to prevent metallic microparticle 20 from adhering to the apparatus, shield plate 27 is disposed between evaporation boat 25 and substrate 18, and opening 28 is provided only in a region to be evaporated in shield plate 27.

Partition plate 29 partitions evaporation regions 30A and 30B. First coarse film layer 19A is formed in evaporation region 30A, and second coarse film layer 19B is formed in evaporation region 30B. Accordingly, evaporation boat 25 and supply portion 26 are disposed in each of evaporation regions 30A and 30B.

A method for producing the present exemplary embodiment will be described hereinafter. In the present exemplary embodiment, coarse film layer 19 is formed as follows by a resistive heating vapor deposition method.

(1) Delivery roller 23 around which substrate 18 is wound is disposed in the vacuum chamber, and the vacuum chamber is evacuated to a vacuum range of 0.01 Pa to 0.001 Pa.

(2) An inert gas in which a flow rate of an argon gas is set to two times to six times a flow rate of an oxygen gas is caused to flow in a neighborhood of substrate 18, thereby setting a pressure of 10 Pa to 30 Pa in the neighborhood of substrate 18.

(3) A temperature at substrate 18 is maintained in a range of 150° C. to 300° C.

(4) Aluminum is supplied from supply portion 26 to evaporation boat 25, and metallic microparticles 20 are evaporated.

(5) Metallic microparticles 20 are stacked on the surface of substrate 18 in evaporation region 30A while substrate 18 is transported from delivery roller 23 toward wind-up roller 24, thereby forming first coarse film layer 19A.

(6) Then, substrate 18 is transported to evaporation region 30B, and second coarse film layer 19B is formed on first coarse film layer 19A while substrate 18 is transported in a predetermined direction (the direction of the arrow P).

Through the above process, coarse film layer 19 is formed on the single side of substrate 18. Substrate 18 is turned back, and metallic microparticles 20 are evaporated while substrate 18 is transported in the same way. Therefore, coarse film layer 19 is also formed on the backside of substrate 18.

In the case that the curved directions of first coarse film layer 19A and second coarse film layer 19B are changed, the transportation direction of substrate 18 may be reversed in evaporation region 30B with respect to that in evaporation region 30A.

Methods for forming and evaluating dielectric film 8 will be described hereinafter. Substrate 18 on which coarse film layer 19 is formed by the evaporation as described above is dipped in a 7% ammonium adipate aqueous solution that is maintained at 70° C., and a chemical conversion treatment is performed at a formation voltage of 5 V, a retaining time of 20 min, and 0.05 A/cm². Then, a sample having a measurement area of 10 cm² is dipped in an 8% ammonium borate aqueous solution that is maintained at 30° C., and an electrostatic capacitance is measured under a condition of measurement frequency of 120 Hz using an impedance analyzer. Dielectric film 8 has a thickness of about 0.01 μm.

Under the above condition, the electrostatic capacitance per unit volume of electrode foil 9 is found to range 35 μF/cm²/μm to 50 μF/cm²/μm. A surface area per unit volume of coarse film layer 19 is found to range $5.0 \times 10^4$ cm²/cm³ to $12.0 \times 10^4$ cm²/cm³. The electrostatic capacitance and the surface area are the values after dielectric film 8 is formed by performing the chemical conversion treatment of electrode foil 9 under the above-mentioned condition.

Figure 21:
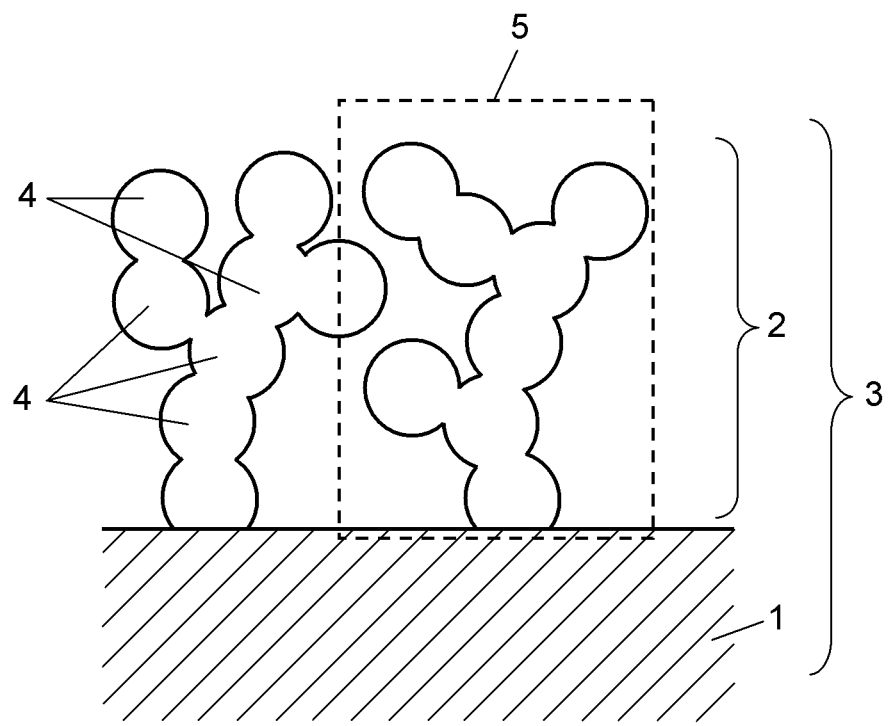
FIG. 21 is a schematic sectional view illustrating a conventional electrode foil.

On the other hand, for conventional electrode foil 3 shown in FIG. 21, the electrostatic capacitance per unit volume is about 25 μF/cm²/μm to about 30 μF/cm²/μm. The surface area per unit volume is about $4.0 \times 10^4$ cm²/cm³.

As described above, in the present exemplary embodiment, metallic microparticles 20 are stacked so as to be curved. Therefore, the number of stacking times can be increased, and the total surface area of coarse film layer 19 can be enlarged even if coarse film layer 19 is thin. As a result, the capacitance of electrode foil 9 can be increased.

In the present exemplary embodiment, coarse film layer 19 is the stacked body including first coarse film layer 19A composed of curved first columnar body 21A, and second coarse film layer 19B composed of curved second columnar body 21B. Compared with the case that coarse film layer 19 is composed of one layer, the number of curved times is increased, the number of stacked metallic microparticles 20 is further increased, and the surface area of coarse film layer 19 can be enlarged.

In the case that coarse film layer 19 is composed of one layer under the condition that coarse film layer 19 has the same thickness as the case that coarse film layer 19 is composed of two layers, it is necessary that columnar body 21 be extremely bent to form a steep curve in order to largely increase the number of stacking times of metallic microparticles 20. On the other hand, in the case that coarse film layer 19 is composed of the plural layers, it is enough that gently-bent columnar bodies 21A and 21B are stacked. Therefore, the mechanical strength can be enhanced in the whole of coarse film layer 19.

Because columnar bodies 21 of first coarse film layer 19A and second coarse film layer 19B are curved in the same direction, a contact area between metallic microparticles 20 is enlarged at an interface between first coarse film layer 19A and second coarse film layer 19B. Accordingly, the bonding strength between first coarse film layer 19A and second coarse film layer 19B can be increased to further enhance the mechanical strength of coarse film layer 19.

In the present exemplary embodiment, coarse film layer 19 has the two-layer structure of first coarse film layer 19A and second coarse film layer 19B. Alternatively, coarse film layer 19 may have a structure of three layers or more. Alternatively, coarse film layer 19 may be constructed only by first coarse film layer 19A. In each case, the surface area of coarse film layer 19 can be enlarged such that metallic microparticles 20 are stacked so as to be curved.

In the present exemplary embodiment, coarse film layers 19 are formed on both sides of substrate 18. Alternatively, coarse film layer 19 may be formed on a single side of substrate 18.

Figure 6:
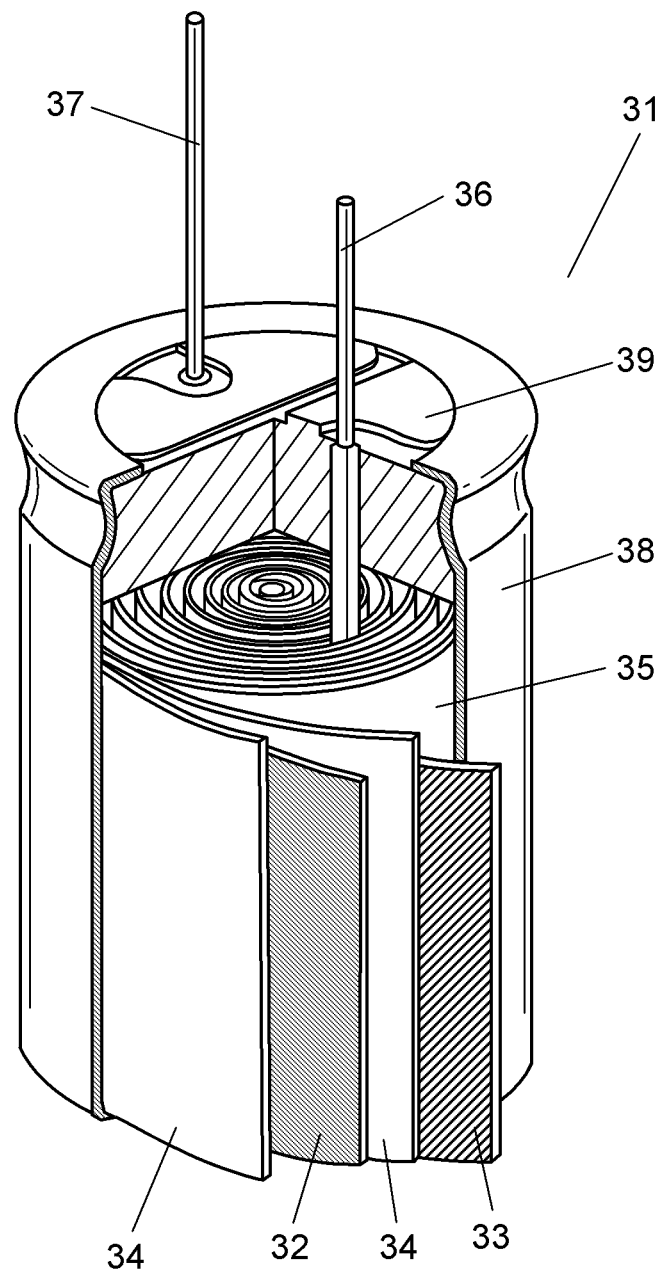
FIG. 6 is a partially cutaway perspective view illustrating another capacitor of the first exemplary embodiment of the invention.

In the present exemplary embodiment, the stacked type solid electrolytic capacitor is described as capacitor 6 by way of example. Alternatively, electrode foil 9 can be used as the positive electrode foil or negative electrode foil of the winding type capacitor. FIG. 6 is a partially cutaway perspective view illustrating another capacitor of the present exemplary embodiment.

Winding type capacitor 31 includes capacitor element 35, a negative electrode material (not illustrated) with which capacitor element 35 is impregnated, positive electrode terminal 36, negative electrode terminal 37, case 38, and sealing member 39. Capacitor element 35 is configured such that positive electrode foil 32 on which the dielectric film is formed and negative electrode foil 33 are wound with separator 34 interposed therebetween. The negative electrode material is made of a conductive polymer, an organic semiconductor, an electrolytic solution, or a composite material thereof. Positive electrode terminal 36 is electrically connected to positive electrode foil 32 of capacitor element 35, and negative electrode terminal 37 is electrically connected to negative electrode foil 33. Case 38 accommodates capacitor element 35 and the negative electrode material therein. Sealing member 39 seals case 38 such that positive electrode terminal 36 and negative electrode terminal 37 are partially exposed to the outside.

In the above configuration, electrode foil 9 in FIG. 3 or 4A can be used as one of or both positive electrode foil 32 and negative electrode foil 33. Therefore, the capacitance of capacitor 31 can be increased. In the case that electrode foil 9 is used as positive electrode foil 32, dielectric film 8 is formed on the surface of coarse film layer 19. In the case that electrode foil 9 is used as negative electrode foil 33, dielectric film 8 is arbitrarily formed.

As described above, even if electrode foil 9 is used as winding type electrolytic capacitor 31 shown in FIG. 6, the capacitance of winding type electrolytic capacitor 31 can be increased.

Second Exemplary Embodiment

Figure 7:
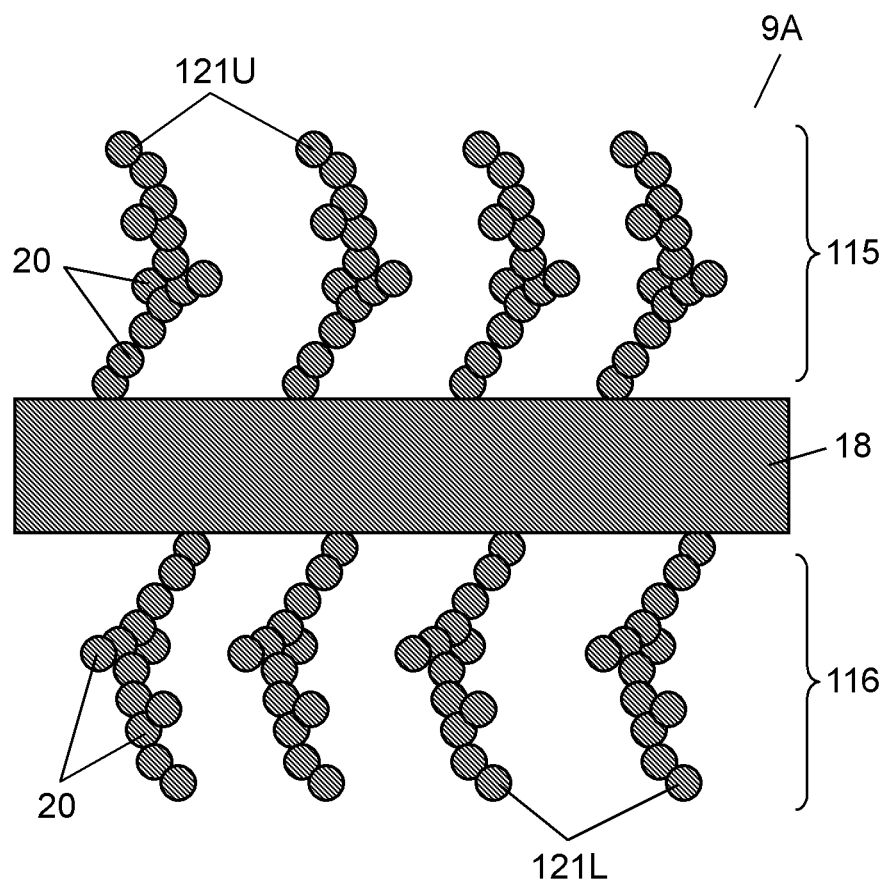
FIG. 7 is a schematic sectional view illustrating an electrode foil according to a second exemplary embodiment of the invention.

FIG. 7 is a schematic sectional view illustrating an electrode foil according to a second exemplary embodiment of the invention. Electrode foil 9A of the present exemplary embodiment is different from electrode foil 9 of the first exemplary embodiment shown in FIG. 3 in that each of the coarse film layers formed on both sides of substrate 18, respectively, is composed of one layer.

That is, substrate 18 includes an upper surface (first surface) and a lower surface (second surface) opposite the upper surface as shown in FIG. 7. Upper coarse film layer 115 having a void therein is formed on the upper surface, and lower coarse film layer 116 having a void therein is formed on the lower surface.

Upper coarse film layer 115 is composed of arrayed upper columnar bodies 121U, and each of upper columnar bodies 121U is composed of metallic microparticles 20 stacked on the upper surface of substrate 18 and extending in a curve from the upper surface of substrate 18. Lower coarse film layer 116 is composed of arrayed lower columnar bodies 121L, and each of lower columnar bodies 121L is composed of metallic microparticles 20 stacked on the lower surface of substrate 18 and extending in a curve from the lower surface of substrate 18.

Configurations of upper columnar body 121U and lower columnar body 121L are identical to the configuration of first columnar body 21A of the first exemplary embodiment. That is, the average particle diameter of metallic microparticles 20 ranges from 0.01 µm to 0.20 µm, inclusive. Upper coarse film layer 115 and lower coarse film layer 116 have many voids therein, and the mode value of the void diameter is the substantially same range of 0.01 µm to 0.20 µm, inclusive, as the average particle diameter of metallic microparticles 20. Because substrate 18 and metallic microparticles 20 are identical those of the first exemplary embodiment, the descriptions are omitted.

Electrode foil 9A having the above configuration can be used as at least one of positive electrode foil 32 and negative electrode foil 33 of winding type capacitor element 35 shown in FIG. 6. In the case that electrode foil 9A is used as positive electrode foil 32, a dielectric film (not illustrated) is formed on the surfaces of substrate 18, upper coarse film layer 115, and lower coarse film layer 116. The method for forming the dielectric film is identical to that of the first exemplary embodiment.

Lower columnar body 121L has the opposite curved direction to upper columnar body 121U. That is, as illustrated in FIG. 7, upper columnar body 121U is curved in the medium so as to be projected rightward in parallel to substrate 18. Lower columnar body 121L is curved in the medium so as to be projected leftward in parallel to substrate 18. That is, upper columnar body 121U and lower columnar body 121L are projected in the completely-reverse directions.

For example, the thicknesses of upper coarse film layer 115 and lower coarse film layer 116 range from 20 µm to 80 µm. It is difficult to enlarge the surface area when the thicknesses of upper coarse film layer 115 and lower coarse film layer 116 are lower than 20 µm, and the mechanical strength is decreased in the current evaporation technology when the thicknesses of upper coarse film layer 115 and lower coarse film layer 116 are more than 80 µm.

Electrode foil 9A can be produced by using a part of the evaporation apparatus in FIG. 5. That is, after first coarse film layer 19A shown in FIG. 3 is formed as upper coarse film layer 115, lower coarse film layer 116 is similarly formed. At this point, for example, the surface on which lower coarse film layer 116 is to be formed is oriented toward evaporation boat 25, and the feed direction of substrate 18 is set to the opposite direction to the direction in which upper coarse film layer 115 is formed. Therefore, the curved direction of lower columnar body 121L can be set opposite the curved direction of upper columnar body 121U.

The dielectric film having the thickness of about 0.01 µm is formed after electrode foil 9A is formed. When the electrostatic capacitance is measured by the same method as the first exemplary embodiment, the electrostatic capacitance per unit volume ranges from 35 µF/cm²/µm to 50 µF/cm²/µm. The surface area per unit volume of each of upper coarse film layer 115 and lower coarse film layer 116 ranges from $5.0 \times 10^4$ cm²/cm³ to $12.0 \times 10^4$ cm²/cm³. The electrostatic capacitance and the surface area are the values after the dielectric film is formed by performing the chemical conversion treatment of electrode foil 9A under the condition mentioned before.

Electrode foil 9A exerts the following effect in addition to the effect of electrode foil 9 of the first exemplary embodiment. That is, in the present exemplary embodiment, the curved direction of upper columnar body 121U is opposite that of lower columnar body 121L. Therefore, in forming capacitor element 35 shown in FIG. 6, one of upper columnar body 121U and lower columnar body 121L is oriented along the winding direction, and the other is oriented opposite the winding direction.

For example, when electrode foil 9A is wound along the direction in which upper columnar body 121U is curved, a stress is hardly applied during the winding. On the other hand, when electrode foil 9A is wound in the opposite direction to the direction in which upper columnar body 121U is curved, the stress is applied to upper columnar body 121U to easily generate a crack. Accordingly, in the case that upper columnar body 121U and lower columnar body 121L are curved in the same direction, the ease of the crack generation largely depends on which upper coarse film layer 115 or lower coarse film layer 116 is used as the upper surface, and the capacitance and a dielectric strength voltage fluctuate.

On the other hand, in the present exemplary embodiment, a ratio at which the crack is generated in electrode foil 9A is averaged even if one of upper coarse film layer 115 and lower coarse film layer 116 is used as the upper surface. Accordingly, electrolytic capacitor 31 having constant performance can stably be produced.

Meanwhile, upper columnar body 121U and lower columnar body 121L have substantially even curvatures in electrode foil 9A. Alternatively, the curvatures may be changed in a stepwise manner in electrode foil 9A. For example, the curvatures of upper columnar body 121U and lower columnar body 121L are increased in a central portion (a diameter of a winding core portion ranges from about 0.5 mm to about 3 mm) in winding electrode foil 9A, and the curvatures may gradually be decreased toward the outermost. That is, it is preferable that the curvatures of upper columnar body 121U and lower columnar body 121L are matched with the curvature of wound electrode foil 9A so as to be decreased from the winding core toward the outermost. Thanks to the configuration, upper columnar body 121U and lower columnar body 121L are more easily suited with the winding structure of electrode foil 9A, and the generation of the crack can efficiently be suppressed in electrode foil 9A. In producing electrode foil 9A with the apparatus in FIG. 5, the curvature may be changed by changing a range of evaporation region 30A or a distance between substrate 18 and boat 25.

Figure 8A:
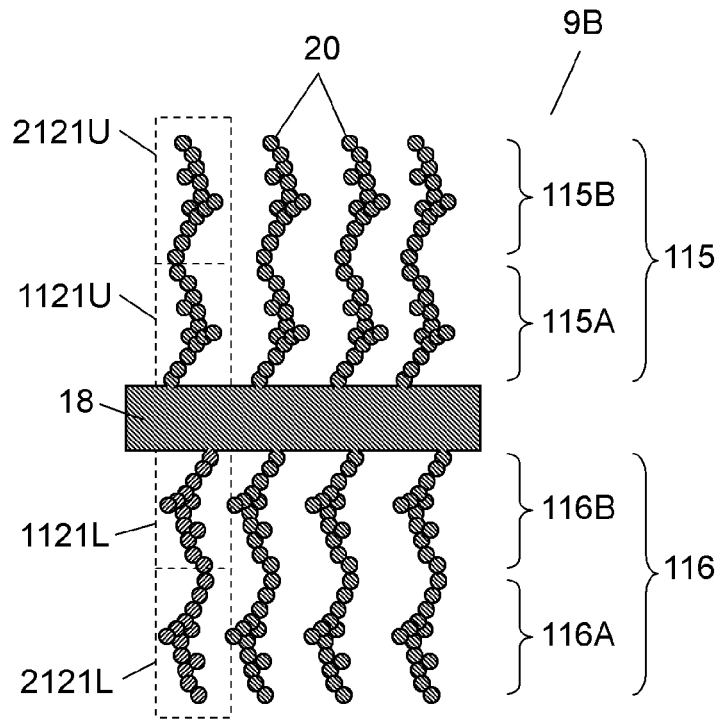
FIG. 8A is a schematic sectional view illustrating another electrode foil of the second exemplary embodiment of the invention.
Figure 8B:
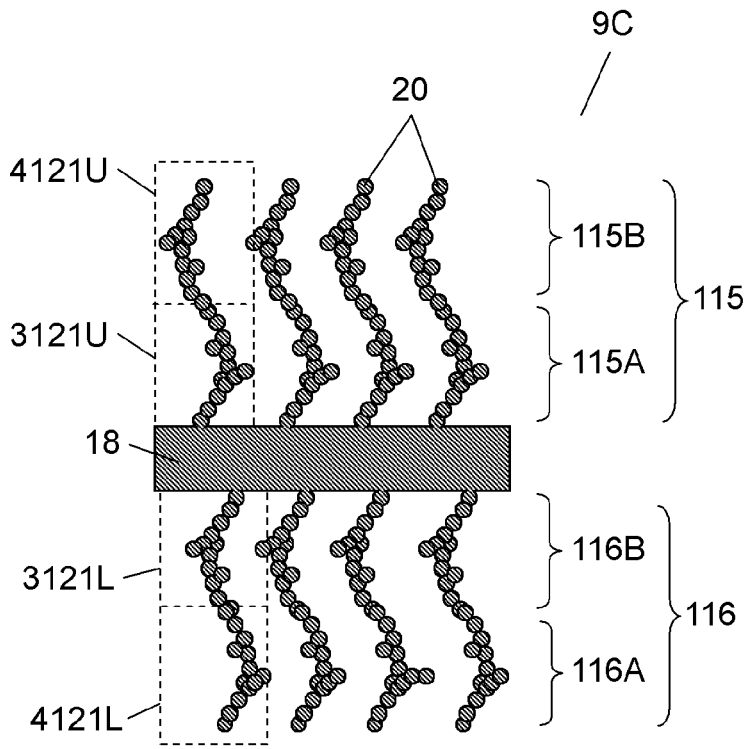
FIG. 8B is a schematic sectional view illustrating still another electrode foil of the second exemplary embodiment of the invention.

Next, another suitable electrode foil of the second exemplary embodiment will be described below with reference to FIGS. 8A and 8B. FIGS. 8A and 8B are schematic sectional views illustrating another electrode foil of the second exemplary embodiment of the invention.

In electrode foils 9B and 9C, upper coarse film layer 115 is composed of a stacked body in which first upper coarse film layer 115A and second upper coarse film layer 115B are stacked. Lower coarse film layer 116 is also composed of a stacked body in which first lower coarse film layer 116B and second lower coarse film layer 116A are stacked. Electrode foils 9B and 9C are different from electrode foil 9A shown in FIG. 7 in these points.

In electrode foil 9B shown in FIG. 8A, first upper coarse film layer 115A is composed of first upper columnar bodies 1121U formed on the upper surface of substrate 18, and second upper coarse film layer 115B is composed of second upper columnar bodies 2121U each formed on first upper columnar body 1121U. First lower coarse film layer 116B is composed of first lower columnar bodies 1121L formed on the lower surface of substrate 18, and second lower coarse film layer 116A is composed of second lower columnar bodies 2121L each formed on first lower columnar body 1121L. First upper columnar body 1121U and second upper columnar body 2121U are curved in the same direction, and first lower columnar body 1121L and second lower columnar body 2121L are curved in the same direction. That is, when only one side of electrode foil 9B is viewed, electrode foil 9B has the same configuration as electrode foil 9 of the first exemplary embodiment.

On the other hand, in electrode foil 9C shown in FIG. 8B, first upper coarse film layer 115A is composed of first upper columnar bodies 3121U formed on the upper surface of substrate 18, and second upper coarse film layer 115B is composed of second upper columnar bodies 4121U each formed on first upper columnar body 3121U. First lower coarse film layer 116B is composed of first lower columnar bodies 3121L formed on the lower surface of substrate 18, and second lower coarse film layer 116A is composed of second lower columnar bodies 4121L each formed on first lower columnar body 3121L. First upper columnar body 3121U is curved in a direction opposite that of second upper columnar body 4121U, and first lower columnar body 3121L is curved in a direction opposite that of second lower columnar body 4121L.

In each case, a first layer of lower coarse film layer 116 corresponding to a first layer of upper coarse film layer 115 is curved in a direction opposite that of the columnar body in the first layer of upper coarse film layer 115. A second layer of lower coarse film layer 116 corresponding to a second layer of upper coarse film layer 115 is curved in a direction opposite that of the columnar body in the second layer of upper coarse film layer 115.

That is, first lower columnar body 1121L is curved in a direction opposite that of first upper columnar body 1121U, and second lower columnar body 2121L is curved in a direction opposite second upper columnar body 2121U. Similarly, first lower columnar body 3121L is curved in a direction opposite that of first upper columnar body 3121U, and second lower columnar body 4121L is curved in a direction opposite that of second upper columnar body 4121U.

The two-layer structure is described in FIGS. 8A and 8B by way of example. In the case of the structure having three layers or more, similarly, the columnar body of each of coarse film layers constituting upper coarse film layer 115 is curved in a direction opposite that of the columnar body of each of coarse film layers corresponding to the layer number in upper coarse film layer 115, of lower coarse film layer 116.

In electrode foils 9B and 9C, metallic microparticles 20 are stacked so as to be curved similarly to electrode foil 9A, whereby the number of stacking times of metallic microparticles 20 can be increased to increase the capacitance of electrolytic capacitor 31. The ratio at which the crack is generated in electrode foil 9A is averaged even if one of upper coarse film layer 115 and lower coarse film layer 116 is used as the upper surface, and electrolytic capacitor 31 having constant performance can stably be produced.

In addition, in electrode foils 9B and 9C, because each of upper coarse film layer 115 and lower coarse film layer 116 is composed of the stacked body of the plural coarse film layers, the number of curved times is increased compared with the case that each of upper coarse film layer 115 and lower coarse film layer 116 is composed of the single layer. Therefore, the number of stacked metallic microparticles 20 is further increased, and the surface areas of upper coarse film layer 115 and lower coarse film layer 116 can be enlarged.

In the case that each of upper coarse film layer 115 and lower coarse film layer 116 is composed of one layer under the condition that upper coarse film layer 115 and lower coarse film layer 116 have the same thickness as in the case that upper coarse film layer 115 is composed of two layers, the number of stacking times of metallic microparticles 20 cannot largely be increased unless the columnar body is extremely bent to form the steep curve. On the other hand, in the case that each of upper coarse film layer 115 and lower coarse film layer 116 is composed of the plural layers, the gently-bent columnar bodies may be stacked, so that the mechanical strength can be enhanced in the wholes of upper coarse film layer 115 and lower coarse film layer 116.

In electrode foils 9B and 9C, similarly to electrode foil 9A, the curvature of the columnar body may gradually be decreased from the winding core toward the outermost.

Third Exemplary Embodiment

Figure 9:
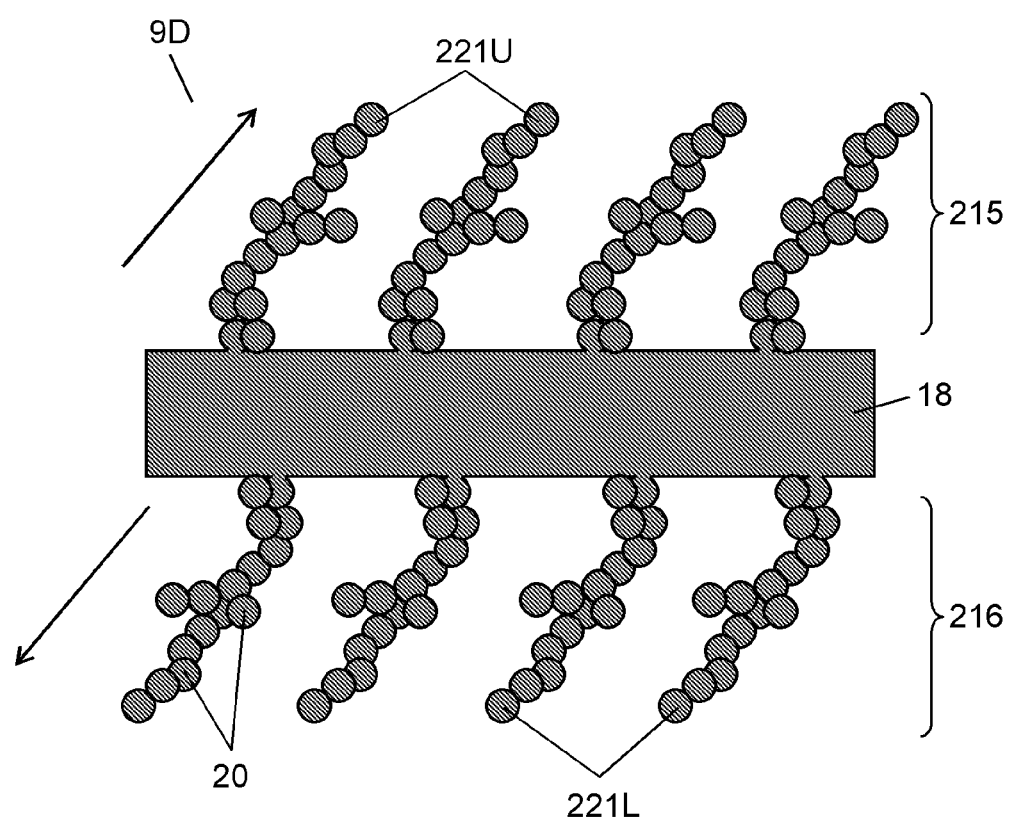
FIG. 9 is a schematic sectional view illustrating an electrode foil according to a third exemplary embodiment of the invention.

FIG. 9 is a schematic sectional view illustrating an electrode foil according to a third exemplary embodiment of the invention. Electrode foil 9D of the third exemplary embodiment is different from electrode foil 9A of the second exemplary embodiment in that upper coarse film layer 215 and lower coarse film layer 216 are formed on substrate 18 instead of upper coarse film layer 115 and lower coarse film layer 116. While upper columnar body 121U in upper coarse film layer 115 and lower columnar body 121L in lower coarse film layer 116 are curved, upper columnar body 221U in upper coarse film layer 215 and lower columnar body 221L in lower coarse film layer 216 are linearly formed. While upper columnar body 221U is diagonally inclined in an upper right direction in FIG. 9, lower columnar body 221L is diagonally inclined in a lower left direction opposite the direction of upper columnar body 221U. Similarly to columnar bodies 121U and 121L of the second exemplary embodiment, upper columnar bodies 221U are parallel to each other, and lower columnar bodies 221L are parallel to each other.

Even if upper columnar body 221U and lower columnar body 221L are obliquely formed as described above, the number of stacking times of metallic microparticles 20 can be increased to implement the large capacitance compared with the case that the columnar body is linearly formed or the columnar body is formed in a random direction. Upper columnar body 221U and lower columnar body 221L are inclined in the directions opposite to each other, whereby the ratio at which the crack is generated in electrode foil 9D can be averaged to stably produce electrode foil 9D even if one of upper coarse film layer 215 and lower coarse film layer 216 is used as the upper surface.

Upper columnar body 221U and lower columnar body 221L can be also produced by arranging the apparatus in FIG. 5. In the case that first columnar body 21A of the first exemplary embodiment is formed, evaporation boat 25 is disposed below a neighborhood of the center of opening 28. On the other hand, for upper columnar body 221U and lower columnar body 221L, evaporation boat 25 may be disposed near a left end of opening 28, namely, below delivery roller 23. In this case, metallic microparticles 20 are always stacked from one direction with respect to a starting point of upper columnar body 221U on delivered substrate 18. Therefore, upper columnar body 221U is not curved but extends in one direction. Lower columnar body 221L is formed such that the same evaporation process is performed while substrate 18 is turned over.

Figure 10A:
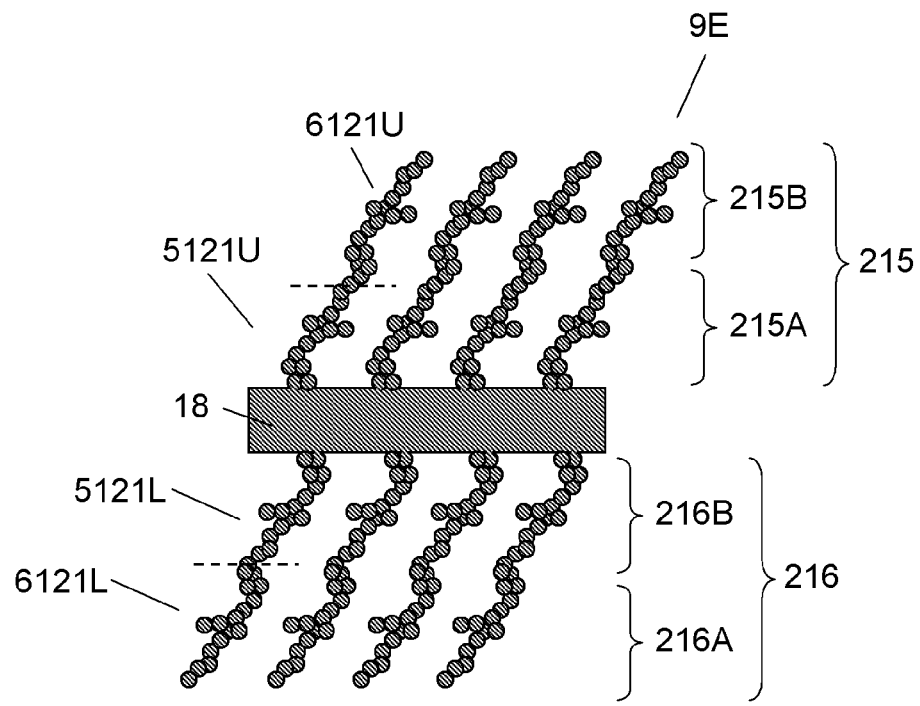
FIG. 10A is a schematic sectional view illustrating another electrode foil of the third exemplary embodiment of the invention.
Figure 10B:
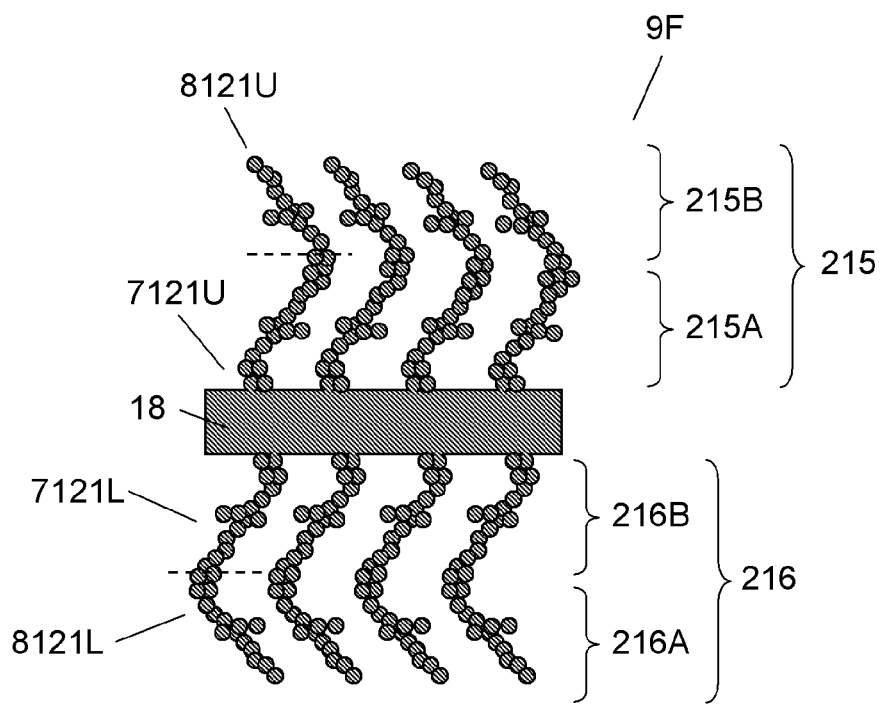
FIG. 10B is a schematic sectional view illustrating still another electrode foil of the third exemplary embodiment of the invention.

Also in the present exemplary embodiment, as illustrated in FIGS. 10A and 10B, upper coarse film layer 215 may be composed of a stacked body in which first upper coarse film layer 215A and second upper coarse film layer 215B are stacked. Lower coarse film layer 216 may be composed of a stacked body in which first lower coarse film layer 216B and second lower coarse film layer 216A are stacked. FIGS. 10A and 10B are schematic sectional views each illustrating another electrode foil of the present exemplary embodiment.

In electrode foil 9E shown in FIG. 10A, first upper coarse film layer 215A is composed of first upper columnar bodies 5121U formed on the upper surface of substrate 18, and second upper coarse film layer 215B is composed of second upper columnar bodies 6121U each formed on first upper columnar body 5121U. First lower coarse film layer 216B is composed of first lower columnar bodies 5121L formed on the lower surface of substrate 18, and second lower coarse film layer 216A is composed of second lower columnar bodies 6121L each formed on first lower columnar body 5121L. First upper columnar body 5121U and first lower columnar body 5121L are inclined in directions opposite to each other. Similarly, second upper columnar body 6121U and second lower columnar body 6121L are inclined in directions opposite to each other. First upper columnar body 5121U and second upper columnar body 6121U are inclined in the same direction, and first lower columnar body 5121L and second lower columnar body 6121L are inclined in the same direction. As a result, the columnar body in which first upper columnar body 5121U and second upper columnar body 6121U are combined is linearly formed, and the columnar body in which first lower columnar body 5121L and second lower columnar body 6121L is combined are linearly formed.

On the other hand, in electrode foil 9F shown in FIG. 10B, first upper coarse film layer 215A is composed of first upper columnar bodies 7121U formed on the upper surface of substrate 18, and second upper coarse film layer 215B is composed of second upper columnar bodies 8121U each formed on first upper columnar body 7121U. First lower coarse film layer 216B is composed of first lower columnar bodies 7121L formed on the lower surface of substrate 18, and second lower coarse film layer 216A is composed of second lower columnar bodies 8121L each formed on first lower columnar body 7121L. First upper columnar body 7121U and first lower columnar body 7121L are inclined in directions opposite to each other. Similarly, second upper columnar body 8121U and second lower columnar body 8121L are inclined in directions opposite to each other. First upper columnar body 7121U and second upper columnar body 8121U are inclined in the directions opposite to each other, and first lower columnar body 7121L and second lower columnar body 8121L are inclined in the directions opposite to each other. As a result, the columnar body in which first upper columnar body 7121U and second upper columnar body 8121U are combined has the curved or bent structure as a whole, and the columnar body in which first lower columnar body 7121L and second lower columnar body 8121L are combined has the curved or bent structure as a whole.

As described above, it is preferable that upper coarse film layer 215 is composed of the stacked body of first upper coarse film layer 215A and second upper coarse film layer 215B, and lower coarse film layer 216 is composed of the stacked body of first lower coarse film layer 116B and second lower coarse film layer 116A. That is, similarly to the second exemplary embodiment, the number of stacking times of metallic microparticles 20 can be increased to increase the capacitance of electrolytic capacitor 31. The ratio at which the crack is generated in electrode foils 9E and 9F is averaged even if any one of the coarse film layers is used as the upper surface, and electrolytic capacitor 31 having constant performance can stably be produced.

The configuration shown in FIG. 10B is the bent or curved structure, the number of stacked metallic microparticles 20 is further increased, and the surface areas of upper coarse film layer 215 and lower coarse film layer 216 can be enlarged.

The descriptions of the same configuration and effect as in the first and second exemplary embodiments are omitted.

In the second and third exemplary embodiments, the winding type electrolytic capacitor 31 is described by way of example. Additionally, for example, the same effect is exerted in a stacked type electrolytic capacitor that is sealed by an outer package while the positive electrode foil and the negative electrode foil are folded in a zigzag manner with separator 34 interposed therebetween. In this case, one of electrode foils 9A to 9H is applied to at least one of the positive electrode foils and the negative electrode foils. The large capacitance can be implemented, and the ratio at which the crack is generated in bending electrode foils 9A to 9F is averaged even if one of electrode foils 9A to 9F is used as the upper surface, and a restoration chemical conversion treatment can be performed on a predetermined condition.

Fourth Exemplary Embodiment

FIG. 11 is a schematic sectional view illustrating an electrode foil according to a fourth exemplary embodiment of the invention. In electrode foil 9G of the fourth exemplary embodiment, the coarse film layers are formed on both sides of substrate 18 similarly to electrode foil 9A shown in FIG. 7 of the second exemplary embodiment. Each coarse film layer is composed of one layer. However, the curved direction of the columnar body constituting the coarse film layer is different.

That is, substrate 18 includes the upper surface (first surface) in FIG. 11 and the lower surface (second surface) opposite the upper surface. Upper coarse film layer 315 having a void therein is formed on the upper surface, and lower coarse film layer 316 having a void therein is formed on the lower surface.

Upper coarse film layer 315 is composed of arrayed upper columnar bodies 221U, and each of upper columnar bodies 221U is composed of metallic microparticles 20 stacked on the upper surface of substrate 18 and extending in a curve from the upper surface of substrate 18. Lower coarse film layer 316 is composed of arrayed lower columnar bodies 221L, and each of lower columnar bodies 221L is composed of metallic microparticles 20 stacked on the lower surface of substrate 18 and extending in a curve from the lower surface of substrate 18. Assuming that a plane located in the center between the upper surface and the lower surface of substrate 18 is defined as center plane 18C, lower columnar body 221L and upper columnar body 221U are symmetrically curved with respect to center plane 18C.

That is, upper coarse film layer 315 is identical to upper coarse film layer 115 of the second exemplary embodiment, and lower coarse film layer 316 is curved in the opposite direction as lower coarse film layer 116 of the second exemplary embodiment. As other configurations are identical to those of the first and second exemplary embodiments, the description is omitted.

Electrode foil 9G having the above configuration can be applied to at least one of positive electrode foil 32 and negative electrode foil 33 of winding type capacitor element 35 shown in FIG. 6. In the case that electrode foil 9G is used as positive electrode foil 32, a dielectric film (not illustrated) is formed on the surfaces of substrate 18, upper coarse film layer 315, and lower coarse film layer 316. The method for forming the dielectric film is identical to that of the first exemplary embodiment.

Figure 12:
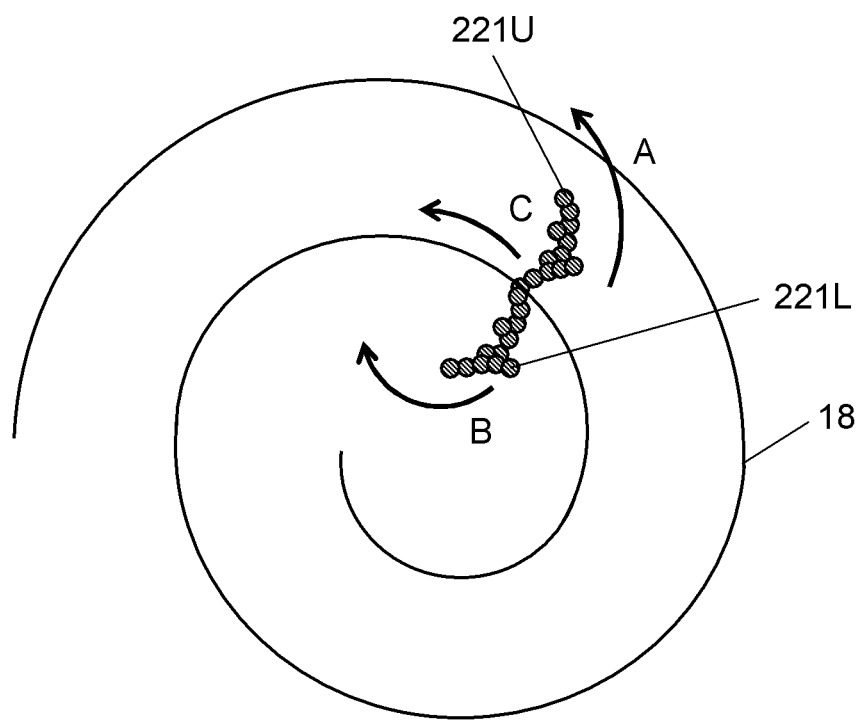
FIG. 12 is a schematic sectional view illustrating a state in which the electrode foil shown in FIG. 11 is wound.

FIG. 12 is a schematic sectional view illustrating a state in which electrode foil 9G shown in FIG. 11 is wound. For the sake of the simple description, single upper columnar body 221U and single lower columnar body 221L are formed on the upper and lower surfaces of substrate 18, respectively. However, many upper columnar bodies 221U are formed on the upper surface and many lower columnar bodies 221L are formed on the lower surface, actually. Both upper columnar body 221U and lower columnar body 221L are projected rightward from substrate 18, and curved so as to extend leftward (directions of arrows A and B) while drawing arcs. The winding direction (arrow C) of electrode foil 9G is oriented from the right toward the left at a point in the surface of substrate 18 on which upper columnar body 221U and lower columnar body 221L are formed. Accordingly, the direction in which upper columnar body 221U and lower columnar body 221L extend in a curve (arrows A and B) is identical to the winding direction (arrow C) of electrode foil 9G.

Electrode foil 9G can be produced by using a part of the evaporation apparatus in FIG. 5. That is, lower coarse film layer 316 is similarly formed after first coarse film layer 19A shown in FIG. 3 is formed as upper coarse film layer 315. At this point, for example, the surface on which lower coarse film layer 316 is formed is oriented toward evaporation boat 25, and the feed direction of substrate 18 is set to the same direction as the direction in which upper coarse film layer 315 is formed. Therefore, the curved direction of lower columnar body 221L can be set identical to the curved direction of upper columnar body 221U.

The dielectric film having the thickness of about 0.01 μm is formed after electrode foil 9G is formed. When the electrostatic capacitance is measured by the same method as the first exemplary embodiment, the electrostatic capacitance per unit volume ranges from 35 μF/cm$^2$/μm to 50 μF/cm$^2$/μm. The surface area per unit volume of each of upper coarse film layer 315 and lower coarse film layer 316 ranges from $5.0 \times 10^4$ cm$^2$/cm$^3$ to $12.0 \times 10^4$ cm$^2$/cm$^3$. The electrostatic capacitance and the surface area are the values after the dielectric film is formed by performing the chemical conversion treatment of electrode foil 9A under the condition mentioned before.

Electrode foil 9G exerts the following effect in addition to the effect of electrode foil 9 of the first exemplary embodiment. In the present exemplary embodiment, upper columnar body 221U and lower columnar body 221L are curved in the same direction, and extend while curved along the winding direction of capacitor element 35. Accordingly, in winding electrode foil 9G, the stress is hardly applied to upper columnar body 221U and lower columnar body 221L, and the generation of the crack in electrode foil 9G can be suppressed.

Upper columnar body 221U and lower columnar body 221L have substantially even curvatures in electrode foil 9G. Alternatively, similarly to the second exemplary embodiment, the curvatures may be changed in the stepwise manner in electrode foil 9G. For example, the curvatures of upper columnar body 221U and lower columnar body 221L are increased in a central portion (a diameter of a winding core portion ranges from about 0.5 mm to about 3 mm) in winding electrode foil 9G, and the curvatures may gradually be decreased toward the outermost. That is, it is preferable that the curvatures of upper columnar body 221U and lower columnar body 221L are matched with the curvature of wound electrode foil 9G so as to be decreased from the winding core toward the outermost. Thanks to the configuration, upper columnar body 221U and lower columnar body 221L are more easily suited with the winding structure of electrode foil 9G, and the generation of the crack can efficiently be suppressed in electrode foil 9G.

Figure 13:
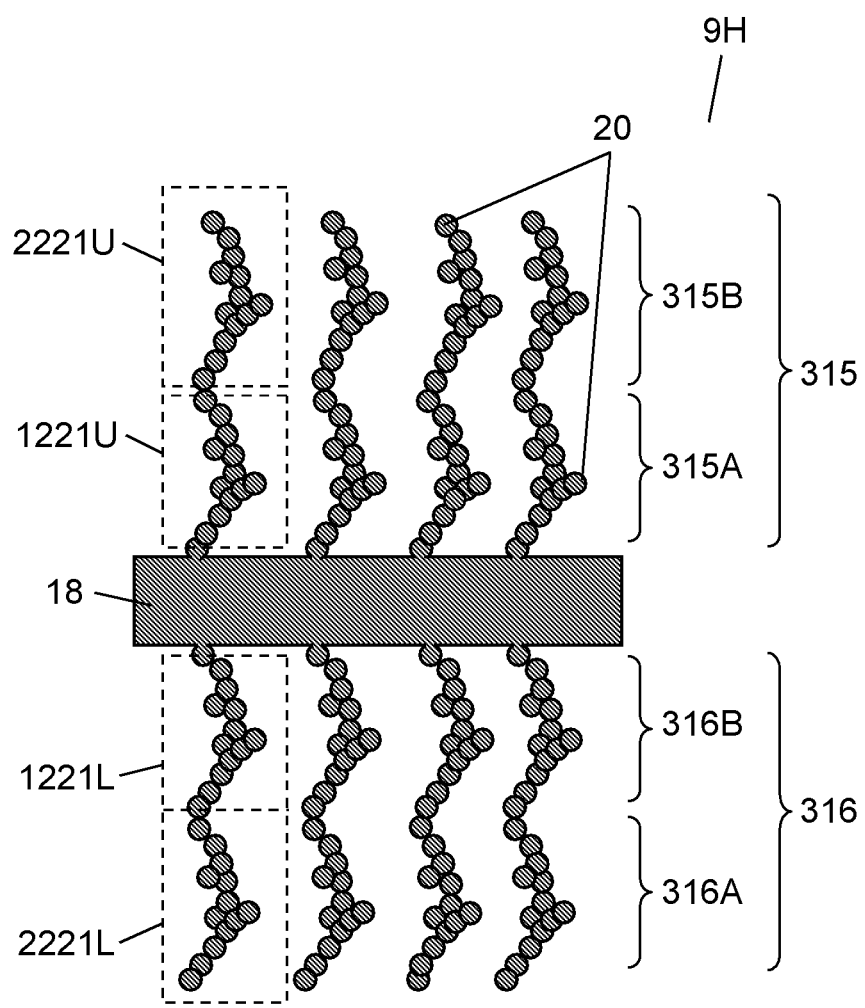
FIG. 13 is a schematic sectional view illustrating another electrode foil of the fourth exemplary embodiment of the invention.

In the present exemplary embodiment, the plural coarse film layers can also be stacked as illustrated in FIG. 13. FIG. 13 is a schematic sectional view illustrating another electrode foil of the fourth exemplary embodiment of the invention.

In electrode foil 9H, upper coarse film layer 315 includes first upper coarse film layer 315A extending from substrate 18 and second upper coarse film layer 315B having a void therein and formed on first upper coarse film layer 315A. First upper coarse film layer 315A is composed of first upper columnar bodies 1221U, and second upper coarse film layer 315B is composed of second upper columnar bodies 2221U. Each of first upper columnar bodies 1221U is composed of metallic microparticles 20 stacked on substrate 18 and extending in a curve from substrate 18. Each of second upper columnar bodies 2221U is composed of metallic microparticles 20 stacked on first upper coarse film layer 315A, curved in the same direction as first upper columnar bodies 1221U, and extending from first upper coarse film layer 315A.

Similarly, lower coarse film layer 316 includes first lower coarse film layer 316B extended from substrate 18 and second lower coarse film layer 316A having a void therein and formed on first lower coarse film layer 316B. First lower coarse film layer 316B is composed of first lower columnar bodies 1221L, and second lower coarse film layer 316A is composed of second lower columnar bodies 2221L. Each of first lower columnar bodies 1221L is composed of metallic microparticles 20 stacked on substrate 18 and extending from substrate 18 so as to be curved. Each of second lower columnar bodies 2221L is composed of metallic microparticles 20 stacked on first lower coarse film layer 316B, curved in the same direction as first lower columnar bodies 1221L, and extending from first lower coarse film layer 316B.

In each of coarse film layers 315A, 315B, 316A, and 316B, the columnar body extending while curved in the same direction as the winding direction of electrode foil 9H, namely, the winding direction of capacitor element 35 allows the generation of the crack to be suppressed in electrode foil 9H. Upper coarse film layer 315 is formed by stacking first upper coarse film layer 315A and second upper coarse film layer 315B, and lower coarse film layer 316 is formed by stacking first lower coarse film layer 316B and second lower coarse film layer 316A, whereby the number of curved times is increased compared with the case that each of upper coarse film layer 315 and lower coarse film layer 316 is composed of one layer. Therefore, the number of stacked metallic microparticles 20 is further increased, and the surface areas of upper coarse film layer 315 and lower coarse film layer 316 can be enlarged. Furthermore, three or four layers can be stacked.

In the case that upper coarse film layer 315 is composed of one layer under the condition that upper coarse film layer 315 and lower coarse film layer 316 have the same thickness as in the case that upper coarse film layer 315 is composed of two layers, the number of stacking times of metallic microparticles 20 cannot largely be increased unless the columnar body is extremely bent to form the steep curve. On the other hand, in the case that each of upper coarse film layer 315 and lower coarse film layer 316 is composed of the plural layers, gently-bent columnar bodies 1221U, 2221U, 1221L, and 2221L may be stacked. Therefore, the mechanical strength can be enhanced in the wholes of upper coarse film layer 315 and lower coarse film layer 316.

In electrode foil 9H, the curvature of the columnar body may gradually be decreased from the winding core toward the outermost in each of coarse film layers 315A, 315B, 316A, and 316B.

As described above, according to the present exemplary embodiment, the columnar body of upper coarse film layer 315 and the columnar body of lower coarse film layer 316 are symmetrically curved with respect to center plane 18C of substrate 18. The direction in which the columnar body extends while curved can be set identical to the winding direction of capacitor element 35, and the generation of the crack can be suppressed in the electrode foil during the winding. Therefore, the leak current can be reduced.

Electrode foils 9G and 9H can also be used in a stacked type electrolytic capacitor in which electrode foils 9G and 9H are folded in the zigzag manner. That is, setting the direction in which electrode foils 9G and 9H are folded in the zigzag manner identical to the direction in which each columnar body extends while curved allows the generation of the crack to be suppressed in electrode foils 9G and 9H.

In the second to fourth exemplary embodiments, electrode foils 9A to 9H are applied to the positive electrode foil by way of example. Alternatively, electrode foils 9A to 9H may be applied to the negative electrode foil. Electrode foils 9A to 9H may be applied to both the positive electrode foil and the negative electrode foil.

In the second to fourth exemplary embodiments, the electrolytic solution is used as the negative electrode material. Alternatively, a solid electrolyte made of a conductive polymer may be used, or the electrolytic solution and the solid electrolyte may be used concurrently. The same holds true for the stacked type electrolytic capacitor in which electrode foils 9G and 9H are folded in the zigzag manner.

In the second to fourth exemplary embodiments, for the sake of convenience, "upper" is added to the element located above substrate 18 in the drawings, and "lower" is added to the element located below substrate 18. However, there is no limitation to the actual usage state.

Fifth Exemplary Embodiment

Figure 14:
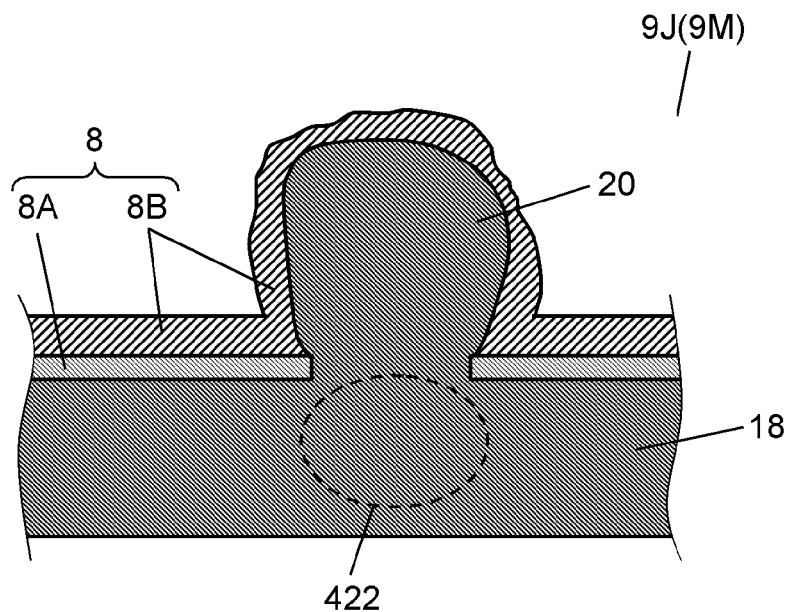
FIG. 14 is a schematic sectional view illustrating an essential part of an electrode foil according to a fifth exemplary embodiment of the invention.
Figure 15:
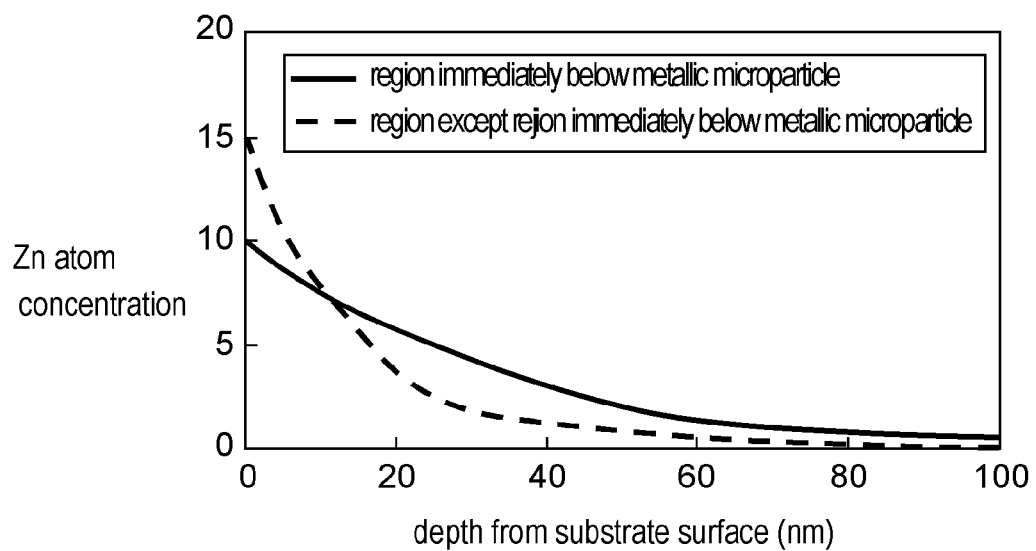
FIG. 15 is a view illustrating a change in zinc atom concentration in a depth direction of the electrode foil in FIG. 14.

Hereinafter, a configuration of an electrode foil according to a fifth exemplary embodiment of the invention will be described with reference to FIGS. 14 and 15. FIG. 14 is a schematic sectional view illustrating an essential part of the electrode foil of the fifth exemplary embodiment of the invention. FIG. 15 is a view illustrating a change in zinc atom concentration in a depth direction of the electrode foil in FIG. 14. Meanwhile, only one metallic microparticle 20 is illustrated for the sake of simple description.

In a region immediately below an interface at which substrate 18 and metallic microparticle 20 are joined in electrode foil 9J, zinc atoms are concentrated so as to form alloy portion 422 containing at least aluminum and zinc. Alloy portion 422 is a feature of the present exemplary embodiment. Accordingly, alloy portion 422 can be applied to the first to fourth exemplary embodiments. For the sake of convenience, coarse film layer 19 of the first exemplary embodiment is described by way of example.

In immediately below metallic microparticle 20, alloy portion 422 is formed in a region from the surface of substrate 18 to a depth of 100 nm. Alloy portion 422 mainly contains aluminum. As shown by a solid line in FIG. 15, a zinc atom concentration ranges from 0.5 atomic % to 20 atomic %, inclusive, in the region from the surface of substrate 18 to the depth of 50 nm, and the zinc atom concentration is gradually decreased toward a point of the depth of 100 nm.

A broken line in FIG. 15 shows the change in zinc atom concentration in the depth direction of substrate 18 in a region except the region immediately below metallic microparticle 20. The zinc atoms are captured in the aluminum oxide film during the anodization, and the zinc atom hardly diffuses even if the heat affects the zinc atom. Therefore, more zinc atoms are distributed in the surface of substrate 18 compared with the region immediately below metallic microparticle 20.

Alloy portion 422 may be made of an aluminum-iron-zinc alloy. In the case that alloy portion 422 also contains iron, an iron atom concentration ranges from 0.5 atomic % to 20 atomic %, inclusive, in the region from the surface of substrate 18 to the depth of 50 nm, and the iron atom concentration is gradually decreased toward the point of the depth of 100 nm. In the case that the aluminum-iron-zinc alloy is applied, because zinc is greater than iron in diffusivity into aluminum, the zinc atoms may exist wider in the depth direction. In this case, zinc may be lower than iron in the atom concentration at an arbitrarily point.

Dielectric film 8 includes first dielectric film 8A formed on an exposed surface of substrate 18 and second dielectric film 8B made of an aluminum oxide formed on first dielectric film 8A and an exposed surface of coarse film layer 19.

First dielectric film 8A and second dielectric film 8B mainly contain the aluminum oxide. However, although second dielectric film 8B contains zinc comparable to an unavoidable impurity, first dielectric film 8A contains zinc more than that in second dielectric film 8B. Specifically, first dielectric film 8A has a zinc content of 0.5 atomic % to 20 atomic %, inclusive. Zinc is contained in first dielectric film 8A as a metal or an oxide (zinc oxide).

In the case that alloy portion 422 includes iron, first dielectric film 8A has an iron content of 0.5 atomic % to 20 atomic %, inclusive. Iron is contained in first dielectric film 8A as a metal or an oxide (iron oxide).

As described above, first dielectric film 8A contains zinc. Therefore, first dielectric film 8A is softened, has an excellent folding property, and can flexibly follow bending. As a result, the crack is hardly generated in first dielectric film 8A.

First dielectric film 8A has a thickness of about 5 nm to about 7 nm, and second dielectric film 8B has a thickness of about 10 nm. When the dielectric film contains zinc or iron, a dielectric constant and/or a withstanding voltage is degraded, and a leak current characteristic is also degraded. Therefore, it is preferable that second dielectric film 8B having a little content of iron or zinc is thicker than first dielectric film 8A.

In the fifth exemplary embodiment, dielectric film 8 formed on substrate 18 has the two-layer structure. However, the structure of dielectric film 8 depends on the condition of the chemical conversion treatment described below. For example, single dielectric film 8 made of a mixture of zinc, iron and an aluminum oxide may be formed on the exposed surface of substrate 18. However, as described above, it is more preferable that dielectric film 8 has the two-layer structure from the viewpoints of the withstanding voltage, dielectric constant, and leak current.

Irrespective of the single layer or the two layers, in dielectric film 8 formed on substrate 18, at least one layer contains zinc, and the zinc atom concentration is greater than that of the unavoidable impurity contained in second dielectric film 8B formed on coarse film layer 19, for example.

Figure 16:
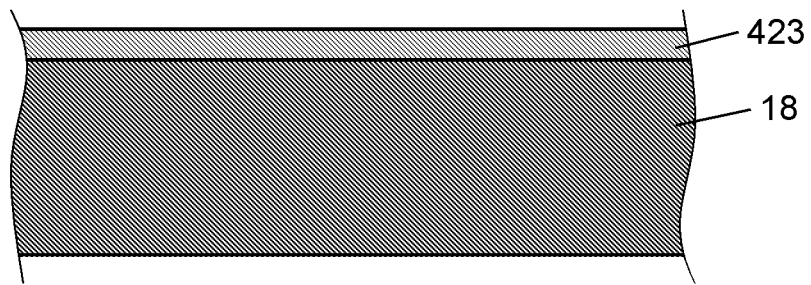
FIG. 16 is a schematic sectional view illustrating a step of a method for producing the electrode foil in FIG. 14.
Figure 17:
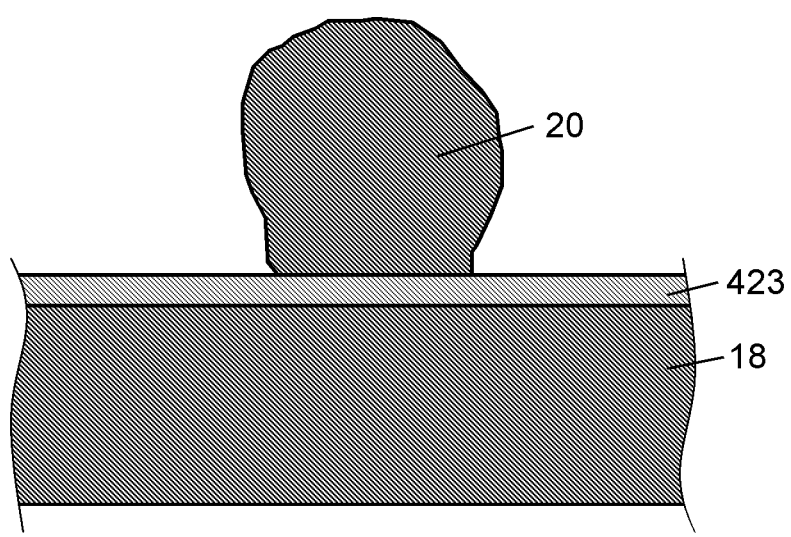
FIG. 17 is a schematic sectional view illustrating a step subsequent to the step in FIG. 16.

A producing method of the present embodiment will be described below with reference to FIGS. 16 and 17. FIG. 16 is a schematic sectional view illustrating a step of the method for producing the electrode foil shown in FIG. 14, and FIG. 17 is a schematic sectional view illustrating a step subsequent to the step in shown FIG. 16.

As illustrated in FIG. 16, underlying layer 423 is formed on the surface of substrate 18. Underlying layer 423 is formed by a dry method typified by a sputtering method and an evaporation method, or molten zinc plating method. Alternatively, when a displacement plating method is adopted, underlying layer 423 can more simply be formed as an even thin film with high productivity.

Substrate 18 is washed as a preliminary treatment using an alkali defatting solution in order to remove an organic substance adhering to the surface of substrate 18 and dissolve an oxide film formed on the surface of substrate 18. Then substrate 18 is subjected to etching in order to form a smooth surface or dissolve the oxide film. The surface of substrate 18 is treated using an acid conditioner in order to remove a residue generated by the etching.

Next, zinc displacement is performed using a zinc displacement solution in order to dissolve the oxide film and form a zinc particle/zinc film. The zinc film as underlying layer 423 can be formed on the aluminum surface by the zinc displacement. In order to obtain the high-quality zinc film, the formed zinc is dissolved using strong acid such as a nitric acid and the zinc displacement is performed again. The thin zinc film is more evenly formed through the double zincate treatment. The effect of the invention is obtained even if aluminum is incompletely covered with zinc because zinc is formed to be coarse by displacement. However, the effect can further be exerted when zinc is formed to be dense by displacement to achieve coverage of at least 80%.

When the zinc film has the thickness of 0.3 nm to 15 nm, inclusive, the productivity, surface stability, and various characteristics can be excellent. In order to form the even, dense zinc film, and/or to form the zinc film having the good adhesion, a zinc compound, an alkali hydroxide, an iron salt, a complexing agent of an iron ion may be contained in the zinc displacement solution. When the zinc displacement is performed using such solutions, iron may be contained in the zinc film. Alternatively, when a metallic salt except the iron salt exists in the zinc displacement solution, the metal of the metallic salt may be contained in the zinc film. It is necessary that at least zinc exist in underlying layer 423.

Underlying layer 423 formed in the above way mainly contains zinc. As to atom concentration ratio, for example, zinc:iron is 7:3. For example, underlying layer 423 has the thickness of about 5 nm.

A natural oxide coating is formed on substrate 18 as time advances. The oxygen atom concentration in the surface of substrate 18 becomes about 45 atomic % in the case that substrate 18 is left for one day since underlying layer 423 is formed. On the other hand, the oxygen atom concentration in the surface of substrate 18 becomes about 55 atomic % in the case that substrate 18 is left for one day while underlying layer 423 is not formed. That is, in the present exemplary embodiment, the oxygen atom concentration in the surface layer can be decreased by about 10 atomic % by forming underlying layer 423. Examples of the method for measuring the oxygen atom concentration in the surface include Auger Electron Spectroscopy (AES), X-ray Photoelectron Spectroscopy (XPS), Transmission Electron Microscopy (TEM).

The oxygen atom concentration is gradually decreased toward the inside from the surface of substrate 18. In the present exemplary embodiment, the oxygen atom concentration is decreased to 10 atomic % at the point of 15 nm-depth from the surface of substrate 18. On the other hand, in the case that underlying layer 423 is not formed, the oxygen atom concentration is decreased to 10 atomic % at the point of 25 nm-depth from the surface of the substrate. That is, the natural oxide coating can be thinned by forming underlying layer 423.

After underlying layer 423 is formed on substrate 18, coarse film layer 19 is formed by the resistive heating evaporation method as below.

(1) Substrate 18 is disposed in the vacuum chamber such that the surface of underlying layer 423 constitutes an evaporation surface, and the vacuum chamber is maintained in a vacuum range of 0.01 Pa to 0.001 Pa, inclusive.

(2) The inert gas in which the flow rate of the argon gas is set to two times to six times the flow rate of the oxygen gas is caused to flow in the neighborhood of substrate 18, thereby setting the pressure to 10 Pa to 30 Pa, inclusive, in the neighborhood of substrate 18.

(3) The temperature at substrate 18 is maintained in a range of 150° C. to 300° C.

(4) An evaporation material disposed opposite substrate 18 is evaporated, and metallic microparticles 20 are deposited on underlying layer 423. At this point, as described in the first exemplary embodiment while referring FIG. 5, coarse film layer 19 can be formed on one side of substrate 18 by moving substrate 18.

Immediately after coarse film layer 19 is formed, base metallic microparticle 20 is formed on underlying layer 423 as illustrated in FIG. 17. For the sake of convenience, only one metallic microparticle 20 is illustrated in FIG. 17. However, plural metallic microparticles 20 are stacked on base metallic microparticle 20, actually.

Because zinc and aluminum in underlying layer 423 are easily dissolved in each other, an interface between metallic microparticle 20 and underlying layer 423 and an interface between underlying layer 423 and substrate 18 are alloyed as time advances. Then, the chemical conversion treatment is performed to substrate 18 on which coarse film layer 19 is formed by the evaporation. The conditions of the chemical conversion treatment are identical to those of the first exemplary embodiment.

The configuration in FIG. 14 is obtained after the chemical conversion treatment. By the voltage application, heat or passage of time in the chemical conversion treatment, the zinc atoms contained in underlying layer 423 diffuse in a downward (inside) direction of substrate 18. The aluminum atoms are exposed in the surface of substrate 18. In the chemical conversion treatment, oxidation progresses from the surface of substrate 18. Therefore, the aluminum atoms exposed in the surface layer are oxidized first, to form second dielectric film 8B. The inside layer in which aluminum is alloyed with zinc is also oxidized to form first dielectric film 8A. Or else, the chemical conversion treatment is easily performed to aluminum existing downward (aluminum is easily oxidized) compared with zinc existing in the surface, and possibly the oxide coating is formed at the same time as the oxidized aluminum diffuses to the zinc side (surface side). Although the mechanism is unclear, in each case, second dielectric film 8B and first dielectric film 8A in which the aluminum layer alloyed with zinc inside aluminum is oxidized are formed.

Because the bonded interface between substrate 18 and metallic microparticle 20 is not oxidized, zinc diffuses in the downward direction of substrate 18 to form alloy portion 422. In the case that underlying layer 423 also contains iron, similarly to zinc, iron diffuses from underlying layer 423 to the inside of substrate 18. At this point, because zinc is easily alloyed with aluminum and easily diffuses compared with iron, the iron atom concentration is greater than the zinc atom concentration in the alloy portion 422 after the chemical conversion treatment.

After the chemical conversion treatment, electrode foil 9J may be put in a furnace to perform a heat treatment at a temperature of 300° C. to 500° C. Therefore, a moisture in dielectric film 8 formed through the anodization can be removed.

The effect of the fifth exemplary embodiment will be described hereinafter. In the case that underlying layer 423 is not provided, an oxide coating may be formed on the surface of substrate 18 before coarse film layer 19 is formed. In this case, coarse film layer 19 and substrate 18 are insulated from each other. Particularly, in the case that the evaporation is performed under an oxygen gas atmosphere, the surface of substrate 18 is easily oxidized to thicken the oxide coating, whereby the problem becomes remarkable. When substrate 18 is insufficiently softened during the evaporation, the adhesion between base metallic microparticle 20 and substrate 18 is degraded. The phenomenon becomes remarkable when the evaporation is performed in a low temperature environment. When the adhesion between coarse film layer 19 and substrate 18 is degraded, coarse film layer 19 may be peeled off from substrate 18. As a result, the electrostatic capacitance of the capacitor may be decreased.

On the other hand, in the present exemplary embodiment, underlying layer 423 that is mainly contains zinc and hardly oxidized compared with aluminum is provided on the surface of substrate 18. Affinity of underlying layer 423 for oxygen is low compared with substrate 18 made of aluminum. Therefore, the oxygen atom concentration in the surface is decreased by 10 atomic %, for example. As a result, the natural oxide coating having the high oxygen content can be thinned. That is, the oxide coating is hardly formed at the interface between metallic microparticle 20 and substrate 18. Accordingly, the insulation at the interface between coarse film layer 19 and substrate 18 can be suppressed and the electrostatic capacitance of the capacitor is increased.

In addition, because zinc is easily alloyed with aluminum, second dielectric film 8B in the surface layer contains few zinc in the chemical conversion treatment, and second dielectric film 8B is made of the aluminum oxide. Accordingly, the relatively high withstanding voltage characteristic and dielectric constant of the aluminum oxide can be maintained, the leak current characteristic of the capacitor is thus improved.

A delamination test based on JIS-K5600 is performed to electrode foil 9J and an electrode foil in which coarse film layer 19 is formed without providing underlying layer 423. In the latter electrode foil, both substrate 18 and metallic microparticle 20 are made of aluminum having purity of at least 99.9 wt %. In the delamination test, the peel-off is started from a portion having relatively weak bonding strength. In the delamination test based on JIS-K5600, notches each of which pierces the coarse film layer to the substrate are provided at equal intervals in the coarse film layer of the electrode foil with a single blade, thereby forming a square lattice pattern (25 cells). A transparent adhesive tape is attached to the lattice pattern, and the adhesive tape is separated from the lattice pattern for 0.5 second to 1.0 second at an angle near 60°. The number of lattices in which coarse film layer 19 is peeled off from the base thereof is visually checked to obtain a peel-off ratio.

As a result of the delamination test, in the electrode foil in which coarse film layer 19 is formed without providing underlying layer 423, the ratio in which the base of coarse film layer 19 is peeled off from substrate 18 is about 50%. On the other hand, in electrode foil 9J, the ratio in which the base of coarse film layer 19 is peeled off from substrate 18 is about 5%. Thus, the formation of underlying layer 423 made of zinc or the zinc alloy enhances the adhesion between metallic microparticle 20 and substrate 18.

Zinc has a melting point of about 420° C., and the melting point of zinc is lower than a melting point (about 660° C.) of aluminum. Accordingly, with increasing zinc atom concentration of underlying layer 423, underlying layer 423 is easily softened during the evaporation, and the adhesion with metallic microparticle 20 is enhanced. Because zinc is easily alloyed with aluminum, metallic bonding is easily generated at the interface between underlying layer 423 and substrate 18 and at the interface between underlying layer 423 and metallic microparticle 20. As a result, the adhesion between underlying layer 423 and metallic microparticle 20 and/or between underlying layer 423 and metallic microparticle 20 is enhanced. The metallic bonding is easily generated between base metallic microparticle 20 and underlying layer 423 by decreasing the oxygen atom concentration, and the adhesion between substrate 18 and metallic microparticle 20 can be enhanced. As a result, the electrostatic capacitance of the capacitor can be increased.

Even in the electrode foil in which coarse film layer 19 is formed without providing underlying layer 423, the adhesion with coarse film layer 19 can be enhanced by raising a temperature at substrate 18. However, in the case that the surface area of coarse film layer 19 is to be enlarged, similarly to the first to fourth embodiments, it is preferable that metallic microparticles 20 are stacked while the particle shape is maintained. When substrate 18 is excessively heated, metallic microparticles 20 may be melted to eliminate the void or metallic microparticles 20 are enlarged. Therefore, it is undesirable to excessively heat substrate 18. On the other hand, when the evaporation is performed in the low temperature environment, substrate 18 is insufficiently softened as described above, and the adhesion between substrate 18 and coarse film layer 19 is degraded. Accordingly, the configuration of the present exemplary embodiment in which only the surface of substrate 18 is selectively softened suitably enhances the adhesion with substrate 18, maintains the enlarged surface area, and increases the capacitance of the capacitor.

Because zinc contained in underlying layer 423 is easily alloyed with aluminum, the metallic bonding is formed at the interface between underlying layer 423 and substrate 18 and at the interface between underlying layer 423 and metallic microparticle 20, thereby enhancing the adhesion. As a result, the peel-off of coarse film layer 19 is reduced, and the decrease in capacitance of capacitor 6 can be suppressed.

In the configuration shown in FIG. 14, first dielectric film 8A and second dielectric film 8B are formed by anode oxidation. Alternatively, dielectric film 8 may be formed on the surfaces of substrate 18 and coarse film layer 19 by various methods such as a liquid phase method, plating, sol-gel, sputtering, and evaporation. As to a composition of dielectric film 8, an oxide such as a titanium oxide and a silicon dioxide or a nitride such as a titanium nitride may be contained instead of the aluminum oxide.

Figure 18:
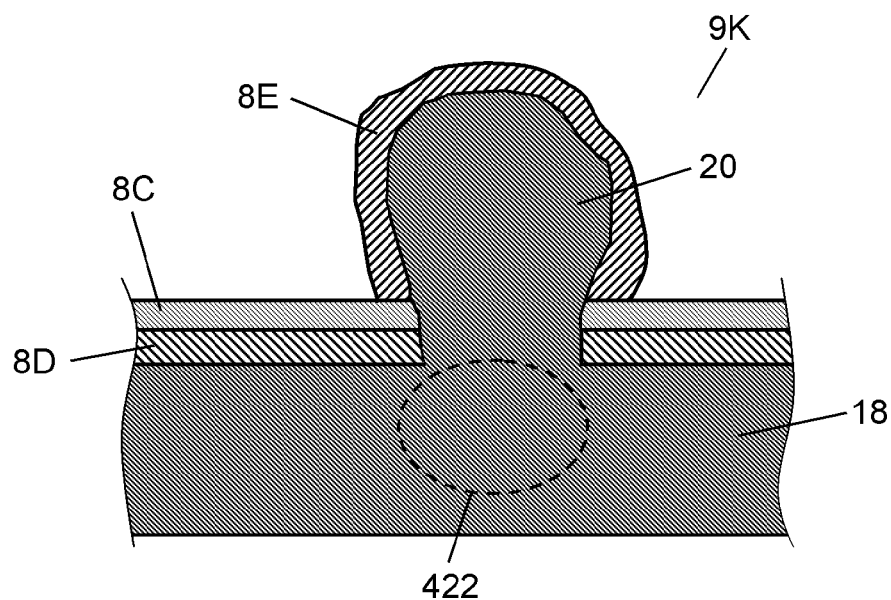
FIG. 18 is a schematic sectional view illustrating an essential part of another electrode foil of the fifth exemplary embodiment of the invention.

The electrode foil may be subjected to a rapid heat treatment before the chemical conversion treatment. Specifically, after the evaporation, the electrode foil is rapidly heated at a temperature of 300° C. to 500° C. When the rapid heat treatment is performed, zinc is oxidized without diffusing in aluminum. FIG. 18 is a schematic sectional view of the electrode foil subjected to the rapid heat treatment.

Third dielectric film 8C containing, for example, 20 atomic % zinc is formed as an upper layer of electrode foil 9K. Third dielectric film 8C mainly contains the aluminum oxide, and zinc is contained in third dielectric film 8C as a metal or an oxide. In the case that substrate 18 including underlying layer 423 containing iron shown in FIG. 16 is subjected to the rapid heat treatment, third dielectric film 8C contains iron. Because zinc hardly diffuses as described above, the zinc atom concentration is higher than the iron atom concentration in third dielectric film 8C.

When the oxidation proceeds, or when the anodization is performed, substrate 18 made of aluminum is also oxidized, and fourth dielectric film 8D made of the aluminum oxide is formed below third dielectric film 8C. That is, from the viewpoint of zinc content, third dielectric film 8C corresponds to first dielectric film 8A, and fourth dielectric film 8D corresponds to second dielectric film 8B. In other words, from the viewpoint of zinc contents, the configuration in FIG. 18 is opposite to the configuration in FIG. 14. Similarly to the configuration in FIG. 14, fifth dielectric film 8E made of the aluminum oxide is formed on the surface of metallic microparticle 20 through the heat treatment or the chemical conversion treatment. For example, third dielectric film 8C has a thickness of 5 nm to 7 nm. For example, each of fourth dielectric film 8D and fifth dielectric film 8E has a thickness of about 10 nm that is more than that of third dielectric film 8C. Alloy portion 422 that is made of aluminum and zinc and possibly iron is formed immediately below the bonded interface between substrate 18 and metallic microparticle 20.

In the configuration described above, similarly to the configuration in FIG. 14, underlying layer 423 made of zinc or the zinc alloy is formed on substrate 18, and metallic microparticle 20 is bonded by the evaporation. Therefore, the oxidation of the surface of substrate 18 can be suppressed, and the adhesion with metallic microparticle 20 is enhanced. As a result, the electrostatic capacitance of the capacitor can be increased. The high dielectric constant and withstanding voltage can be maintained because of the low zinc or iron atom concentration in fourth dielectric film 8D.

As described above, second dielectric film 8B or fifth dielectric film 8E, which mainly contains the aluminum oxide, is formed on the exposed surface of metallic microparticles 20 constituting coarse film layer 19. On the other hand, second dielectric film 8B and first dielectric film 8A or third dielectric film 8C and fourth dielectric film 8D, which mainly contain the aluminum oxide, are formed on the exposed surface of substrate 18. While second dielectric film 8B and fifth dielectric film 8E are substantially made of the aluminum oxide, the total of second dielectric film 8B and first dielectric film 8A or the total of third dielectric film 8C and fourth dielectric film 8D contains a zinc component and/or an iron component. Accordingly, the zinc atom concentration of the dielectric film formed on the exposed surface of substrate 18 is greater than the zinc atom concentration of the dielectric film formed on the exposed surface of metallic microparticles 20.

Each of electrode foils 9J and 9K includes the dielectric film, so that electrode foils 9J and 9K can be applied to both the electrode foil constituting the positive electrode of the stacked type solid electrolytic capacitor shown in FIGS. 1 and 2B and the positive electrode foil of the winding type solid electrolytic capacitor shown in FIG. 6. Alternatively, the electrode foil may be used as the negative electrode foil of the winding type solid electrolytic capacitor without forming the dielectric film. That is, the electrode foil shown in FIG. 7 may be used as the negative electrode foil.

Figure 19:
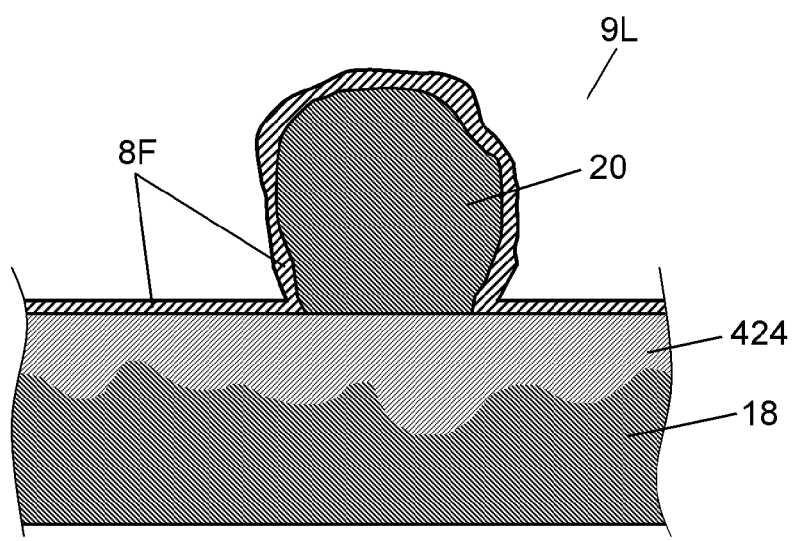
FIG. 19 is a schematic sectional view illustrating an essential part of still another electrode foil of the fifth exemplary embodiment of the invention.

For the negative electrode foil, dielectric film 8 may be formed on the electrode foil through the chemical conversion treatment, or the metallic surface may remain exposed without performing the chemical conversion treatment. FIG. 19 is a schematic sectional view of such an electrode foil.

In the case that the chemical conversion treatment is not performed, sixth dielectric film 8F that is of the thin natural oxide film is formed on the surface of electrode foil 9L as time advances. Electrode foil 9L includes substrate 18 that mainly contains aluminum and coarse film layer 19 that is formed on substrate 18 while metallic microparticles 20 each of which mainly contains aluminum are stacked. In substrate 18, alloy layer 424 made of aluminum and zinc is formed inside the surface on which coarse film layer 19 is formed, and sixth dielectric film 8F is formed on the exposed surfaces of substrate 18 and coarse film layer 19. Alloy layer 424 may contain iron. That is, alloy layer 424 may be made of the aluminum-iron-zinc alloy.

Zinc or iron, which is contained in underlying layer 423, diffuses in the downward direction (lower side) of substrate 18 as time advances. Therefore, after coarse film layer 19 is formed, aluminum atoms are exposed in the surface of substrate 18. Aluminum is naturally oxidized to form sixth dielectric film 8F. Instead of forming sixth dielectric film 8F by the natural oxidation, sixth dielectric film 8F may be formed by a sol-gel method or a plating method.

In the configuration shown in FIG. 19, similarly to the configuration shown in FIG. 14, when underlying layer 423 made of zinc or the zinc alloy is formed before the evaporation, the oxygen atom ratio can be decreased in the surface and the adhesion between coarse film layer 19 and substrate 18 can be enhanced.

Because zinc is easily alloyed with aluminum, the natural oxide coating (sixth dielectric film 8F) formed as time advances is made of the substantially pure aluminum oxide. Accordingly, the relatively high withstanding voltage and dielectric constant of the aluminum oxide can be maintained.

Alternatively, silicon may be used instead of zinc. That is, a foil made of an aluminum-silicon alloy, in which aluminum is mainly contained while silicon is contained in a range of 3 atomic % to 10 atomic %, inclusive, may be used as substrate 18. It is only necessary to alloy the surface (a depth of about 100 nm from the outermost surface) in which the coarse film layer 19 is formed. Substrate 18 is made only of aluminum and silicon except the unavoidable impurity. When the main content of substrate 18 is (Al+Si), a ratio of the main content is 99.5 atomic % or more.

In coarse film layer 19, part of or the whole of base metallic microparticle 20 bonded to substrate 18 may be made of the aluminum-silicon alloy. The reason why base metallic microparticle 20 is made of the aluminum-silicon alloy is that the silicon atoms in the surface of substrate 18 diffuse into metallic microparticle 20 and is alloyed with metallic microparticle 20. Only base metallic microparticle 20 is alloyed, but metallic microparticles 20 in the medium and the surface of coarse film layer 19 are not alloyed.

When the delamination test based on JIS-K5600 is performed to electrode foil 9M shown in FIG. 14 in which the aluminum-silicon alloy foil is used as substrate 18, the ratio in which the base of coarse film layer 19 is peeled off from substrate 18 is decreased to about 5%. This is because the adhesion between substrate 18 and metallic microparticle 20 located in the base of coarse film layer 19 is high.

When the surface of substrate 18 is made of the aluminum-silicon alloy in which silicon is contained in a range of 3 atomic % to 10 atomic %, inclusive, a state close to a eutectic state is obtained, the melting point of the surface of substrate 18 is thus lowered, and substrate 18 is easily softened.

Figure 20:
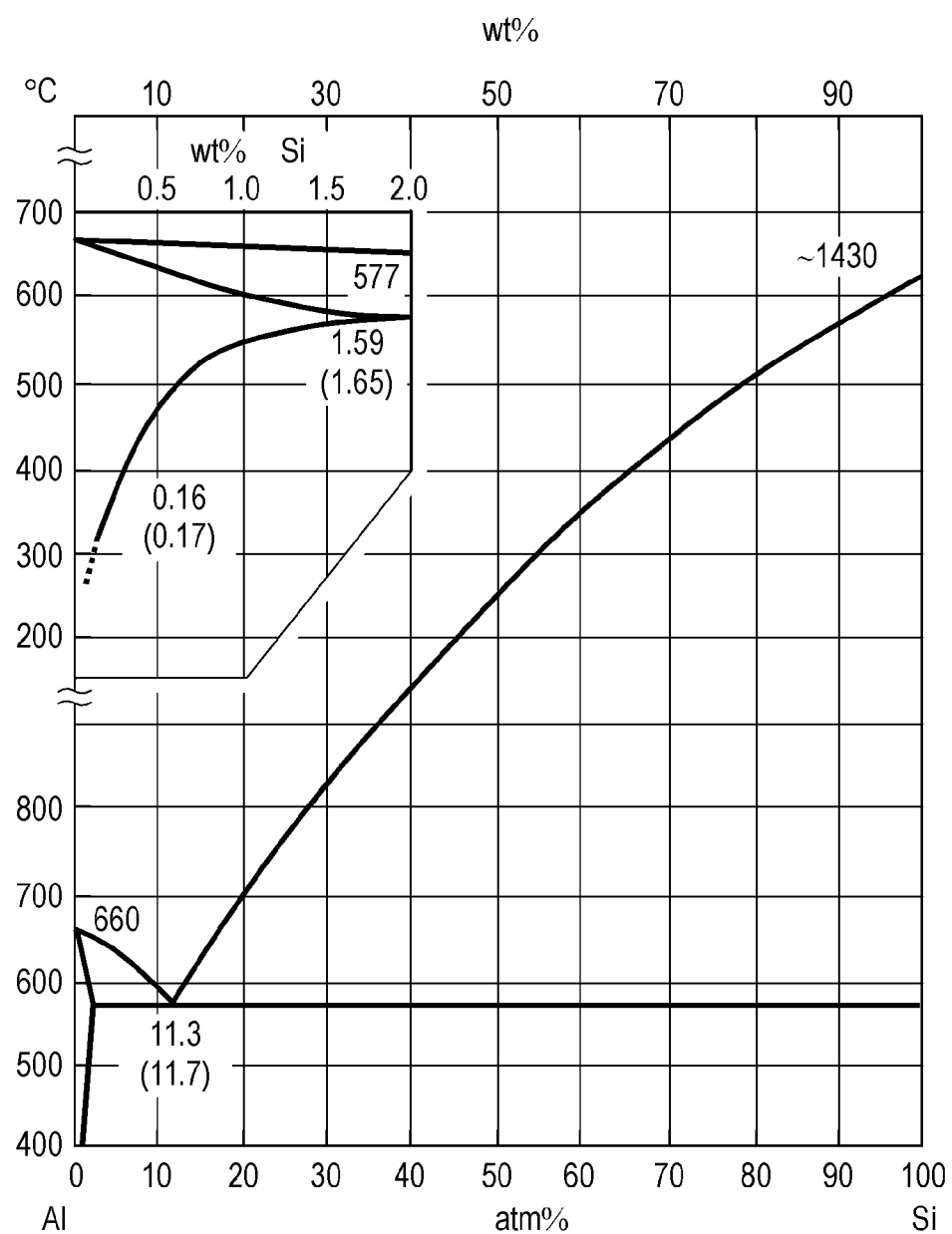
FIG. 20 is a view illustrating a relationship between a melting point and a silicon concentration of an aluminum-silicon alloy.

FIG. 20 illustrates a relationship between a silicon concentration (atomic %) and the melting point of the aluminum-silicon alloy. The aluminum-silicon alloy has a eutectic point at the silicon concentration of 11 atomic % to 12 atomic %, and the melting point at the eutectic point is largely decreased compared with the melting point (about 660° C.) of the pure aluminum.

The melting point is gradually decreased from the silicon concentration of 0 atomic % toward the eutectic point, and the melting point can be decreased by 15° C. or more compared with the pure aluminum in the range from 3 atomic % to the eutectic point. On the other hand, when the silicon concentration exceeds 10 atomic %, hardness of substrate 18 is increased and substrate 18 is hardly elongated.

Accordingly, it is preferable that the silicon concentration ranges from 3 atomic % to 10 atomic %, inclusive, from the viewpoint of easiness of softening and elongation. The use of substrate 18 having the above composition can sufficiently soften the surface of substrate 18 even in the relatively low temperature environment in which the shape of metallic microparticle 20 can be maintained. Therefore, the contact area between the surface of substrate 18 and base metallic microparticle 20 can be enlarged. As a result, the adhesion between coarse film layer 19 and substrate 18 can be enhanced to suppress the peel-off.

In base metallic microparticle 20 bonded to substrate 18, it is conceivable that the silicon atoms of substrate 18 diffuse into the interface side with substrate 18 and alloyed. Accordingly, in the substrate 18 side of base metallic microparticle 20, the melting point is lowered and softening is easily generated during the evaporation compared with not-alloyed metallic microparticle 20 on the surface side. As a result, the metallic bonding between substrate 18 and base metallic microparticle 20 can strongly generated to suppress the peel-off of coarse film layer 19 from substrate 18.

The whole of base metallic microparticle 20 may be alloyed, and some metallic microparticles 20 stacked on base metallic microparticle 20 may also be alloyed. However, only base metallic microparticle 20 is substantially alloyed under the conditions of the silicon concentration, the particle diameter of metallic microparticle 20, and evaporation temperature. Specifically, only the neighborhood of the interface between base metallic microparticle 20 and substrate 18 is alloyed. Because the aluminum oxide is higher than the silicon oxide in the dielectric constant of the oxide coating, it is more preferable that only the interface with substrate 18 is alloyed.

In the process of producing electrode foil 9M, after coarse film layer 19 is formed, the heat treatment may be performed in order to enhance the adhesion between substrate 18 and coarse film layer 19. In electrode foil 9J, the heat treatment temperature can be lowered because of the low softening temperature of substrate 18. Therefore, the metallic bonding between base metallic microparticle 20 and substrate 18 can strongly generated while the shape of metallic microparticle 20 is maintained. As a result, the electrode foil 9M having a large capacitance and high reliability can be produced.

The silicon atoms of substrate 18 easily diffuse into the base metallic microparticle 20 side by thermal energy of the heat treatment, and base metallic microparticle 20 is alloyed. Accordingly, the melting point of base metallic microparticle 20 can selectively be lowered, and the metallic bonding between metallic microparticle 20 and substrate 18 is more easily generated. As a result, the peel-off of substrate 18 and coarse film layer 19 can more effectively be suppressed.

Instead of using the aluminum-silicon alloy foil as substrate 18, the alloy layer may be formed only in the surface on which metallic microparticle 20 is stacked. That is, underlying layer 423 is made of silicon in FIGS. 16 and 17, and the alloy layer can be formed by forming dielectric film or natural diffusion. Alternatively, the alloy layer may be formed by ion plating or sputtering. It is necessary that the alloy layer be in close contact with base metallic microparticle 20. Therefore, it is supposed that the alloy layer may have the thickness of about 100 nm. When the alloy layer has the thickness more than a radius to a diameter of base metallic microparticle 20, the interface between base metallic microparticle 20 and substrate 18 is alloyed, and the adhesion can effectively be enhanced.

The present exemplary embodiment is described based on the premise that the coarse film layer is formed similarly to the first to fourth exemplary embodiments. Alternatively, the configuration is applicable to a structure in which plural metallic microparticles 20 are irregularly bonded and branched to form the sea-grape type or tree-type coarse film layer. That is, the present exemplary embodiment may be applied to the electrode foil disclosed in Unexamined Japanese Patent Publication No. 2008-258404. The present exemplary embodiment is not limited to the internal structure of the coarse film layer as long as plural metallic microparticles 20 are bonded to form the coarse film layer having the void therein.

INDUSTRIAL APPLICABILITY

The electrode foil of the present invention is effectively used for compact capacitors having large-capacitance.

The invention claimed is:

1. An electrode foil comprising:
a substrate; and
a coarse film layer having a void therein and a thickness of at least 20 μm, and formed on the substrate,
wherein the coarse film layer includes at least a first coarse film layer formed on the substrate, the first coarse film layer is composed of arrayed first columnar bodies,
each of the first columnar bodies is composed of metallic microparticles stacked on a surface of the substrate in such a manner that an original shape of each of the metallic microparticles is maintained, and is branched and extends from the surface of the substrate so as to be curved at a portion between a base and a leading end of each of the first columnar bodies, and
the first columnar bodies are curved in an identical direction and substantially parallel to each other.

2. The electrode foil according to claim 1, wherein the coarse film layer has a surface area per unit volume of $5.0 \times 10^4$ cm$^2$/cm$^3$ or more.

3. The electrode foil according to claim 1, wherein the coarse film layer further includes a second coarse film layer having a void therein and formed on the first coarse film layer, the second coarse film layer is composed of second columnar bodies, and each of the second columnar bodies is composed of metallic microparticles stacked on the first coarse layer and extending from in a curve the first coarse film layer.

4. The electrode foil according to claim 3, wherein the second columnar bodies are curved in an identical direction.

5. The electrode foil according to claim 1,
wherein the substrate includes a first surface and a second surface opposite the first surface,
the coarse film layer is an upper coarse film layer formed on the first surface, the first coarse film layer is a first upper coarse film layer formed on the substrate, the first columnar bodies are first upper columnar bodies, a lower coarse film layer having a void therein is formed on the second surface of the substrate, the lower coarse film layer includes at least a first lower coarse film layer formed on the second surface of the substrate, the first lower coarse film layer is composed of arrayed first lower columnar bodies, each of the first lower columnar bodies is composed of metallic microparticles stacked on the second surface of the substrate and extending in a curve from the second surface of the substrate, and the first lower columnar bodies are curved in an opposite direction to the first upper columnar bodies.

6. The electrode foil according to claim 5, wherein the upper coarse film layer further includes a second upper coarse film layer having a void therein and formed on the first coarse film layer, the second upper coarse film layer is composed of second upper columnar bodies, each of the second upper columnar bodies is composed of metallic microparticles stacked on the first upper coarse film layer and extending in a curve from the first upper coarse film layer, the lower coarse film layer includes a second lower coarse film layer having a void therein and formed on the first lower coarse film layer, the second lower coarse film layer is composed of second lower columnar bodies, each of the second lower columnar bodies is composed of metallic microparticles stacked on the first lower coarse film layer and extending in a curve from the first lower coarse film layer, and the second lower columnar bodies are curved in an opposite direction to the second upper columnar bodies.

7. The electrode foil according to claim 5, wherein each of the upper coarse film layer and the lower coarse film layer has a surface area per unit volume of $5.0 \times 10^4$ cm$^2$/cm$^3$ or more.

8. The electrode foil according to claim 1, wherein the substrate includes a first surface and a second surface opposite the first surface, a plane existing at a center position between the first surface and the second surface is defined as a center plane, the coarse film layer is an upper coarse film layer formed on the first surface, the first columnar bodies are first upper columnar bodies, a lower coarse film layer having a void therein is formed on the second surface of the substrate, the lower coarse film layer includes at least a first lower coarse film layer formed on the second surface of the substrate the first lower coarse film layer is composed of arrayed first lower columnar bodies, each of the first lower columnar bodies is composed of metallic microparticles stacked on the second surface of the substrate and extending in a curve from the second surface of the substrate, and the first lower columnar bodies and the first upper columnar bodies are symmetrically curved with respect to the center plane of the substrate.

9. The electrode foil according to claim 8, wherein the upper coarse film layer further includes a second upper coarse film layer having a void therein and formed on the first coarse film layer, the second upper coarse film layer is composed of second upper columnar bodies, each of the second upper columnar bodies is composed of metallic microparticles stacked on the first upper coarse film layer and extending in a curve from the first upper coarse film layer in an identical direction with the first upper columnar bodies, the lower coarse film layer further includes a second lower coarse film layer having a void therein and formed on the first lower coarse film layer, the second lower coarse film layer is composed of second lower columnar bodies, and each of the second lower columnar bodies is composed of metallic microparticles stacked on the first lower coarse film layer and extending in a curve from the first lower coarse film layer in an identical direction with the first lower columnar bodies.

10. The electrode foil according to claim 8, wherein each of the upper coarse film layer and the lower coarse film layer has a surface area per unit volume of $5.0 \times 10^4$ cm$^2$/cm$^3$ or more.

11. An electrode foil comprising:

a substrate; and a coarse film layer having a void therein and formed on the substrate, wherein the coarse film layer includes at least a first coarse film layer formed on the substrate, the first coarse film layer is composed of arrayed first columnar bodies, each of the first columnar bodies is composed of metallic microparticles stacked on a surface of the substrate and extends in a curve from the surface of the substrate, and the substrate and the coarse film layer mainly contain aluminum, and an alloy containing at least aluminum and zinc is formed in a region immediately below a bonded interface between the substrate and one of the metallic microparticles as an alloy portion, or the alloy is formed inside the surface, of the substrate, on which the coarse film layer is formed, as an alloy layer.

12. The electrode foil according to claim 11, wherein in a case where the alloy portion is formed, a dielectric film mainly containing an aluminum oxide is formed on exposed surfaces of the substrate and the metallic microparticles, and a zinc atom concentration in the dielectric film formed on the exposed surface of the substrate is greater than a zinc atom concentration in the dielectric film formed on the exposed surface of the metallic microparticles.

13. The electrode foil according to claim 11, wherein in a case where the alloy is formed, a dielectric film is formed on exposed surfaces of the substrate and the coarse film layers.

14. The electrode foil according to claim 1 wherein the substrate and the coarse film layer mainly contain aluminum, and at least the surface, of the substrate, on which the coarse film layer is formed is made of an aluminum-silicon alloy containing silicon of 3 atomic % to 10 atomic %, inclusive.

15. The electrode foil according to claim 14, wherein an interface between each of the metallic microparticles located in a base of the coarse film layer and the substrate is made of an aluminum-silicon alloy.

16. A capacitor comprising:

a capacitor element having:

a positive electrode foil on which a dielectric film is formed;

a solid electrolytic layer formed on the dielectric film of the positive electrode foil; and a negative electrode layer formed on the solid electrolytic layer; and an outer package covering the capacitor element, wherein the positive electrode foil includes a substrate and a coarse film layer having a void therein and a thickness of at least 20 μm, and formed on the substrate, the coarse film layer includes at least a first coarse film layer formed on the substrate, the first coarse film layer is composed of arrayed first columnar bodies, each of the first columnar bodies is composed of metallic microparticles stacked on a surface of the substrate in such a manner that an original shape of each of the metallic microparticles is maintained, and is branched and extends from the surface of the substrate so as to be curved at a portion between a base and a leading end of each of the first columnar bodies, the first columnar bodies are curved in an identical direction and substantially parallel to each other, and the dielectric film is formed on the coarse film layer.

17. A capacitor comprising:
a capacitor element having:
   a positive electrode foil on which a dielectric film is formed;
   a solid electrolytic layer formed on the dielectric film of the positive electrode foil; and
   a negative electrode layer formed on the solid electrolytic layer; and
an outer package covering the capacitor element,
wherein the positive electrode foil includes a substrate and a coarse film layer having a void therein and formed on the substrate,
the coarse film layer includes at least a first coarse film layer formed on the substrate, the first coarse film layer is composed of arrayed first columnar bodies, each of the first columnar bodies is composed of metallic microparticles stacked on a surface of the substrate and extends in a curve from the surface of the substrate, and the dielectric film is formed on the coarse film layer, and
the substrate and the coarse film layer mainly contain aluminum, and an alloy portion containing at least aluminum and zinc is formed in a region immediately below a bonded interface between the substrate and one of the metallic microparticles.

18. The capacitor according to claim 16, wherein the substrate and the coarse film layer mainly contain aluminum, and at least the surface, of the substrate, on which the coarse film layer is formed is made of an aluminum-silicon alloy containing silicon of 3 atomic % to 10 atomic %, inclusive.

19. A capacitor comprising:
a capacitor element having:
   a positive electrode foil on which a dielectric film is formed;
   a negative electrode foil; and
   a separator interposed between the positive electrode foil and the negative electrode foil;
a negative electrode material with which the capacitor element is impregnated;
a case accommodating the capacitor element therein; and
a sealing unit sealing the case,
wherein at least one of the positive electrode foil and the negative electrode foil includes a substrate and a coarse film layer having a void therein and a thickness of at least 20 µm, and formed on the substrate,
the coarse film layer includes at least a first coarse film layer formed on the substrate, the first coarse film layer is composed of arrayed first columnar bodies, each of the first columnar bodies is composed of metallic microparticles stacked on a surface of the substrate in such a manner that an original shape of each of the metallic microparticles is maintained, and is branched and extends from the surface of the substrate so as to be curved at a portion between a base and a leading end of each of the first columnar bodies, the first columnar bodies are curved in an identical direction and substantially parallel to each other, and the dielectric film is formed on the coarse film layer in a case that the positive electrode foil includes the coarse film layer.

20. The capacitor according to claim 19,
wherein the capacitor element is constructed by winding or folding the positive electrode foil, the separator, and the negative electrode foil together,
in at least one of the positive electrode foil and the negative electrode foil, in which the coarse film layer is formed, the substrate includes a first surface and a second surface opposite the first surface, the coarse film layer is an upper coarse film layer formed on the first surface, the first columnar bodies are first upper columnar bodies,
a lower coarse film layer having a void therein is formed on the second surface of the substrate, the lower coarse film layer includes at least a first lower coarse film layer formed on the second surface of the substrate, the first lower coarse film layer is composed of arrayed first lower columnar bodies, each of the first lower columnar bodies is composed of metallic microparticles stacked on the second surface of the substrate and extending in a curve from the second surface of the substrate,
the first lower columnar body is curved in an opposite direction to the first upper columnar body, and
the dielectric film is formed on both the upper coarse film layer and the lower coarse film layer in a case that the positive electrode foil includes the upper coarse film layer and the lower coarse film layer.

21. The capacitor according to claim 19,
wherein the capacitor element is constructed by winding or folding the positive electrode foil, the separator, and the negative electrode foil together,
in at least one of the positive electrode foil and the negative electrode foil, in which the coarse film layer is formed, the substrate includes a first surface and a second surface opposite the first surface, a plane existing at a center position between the first surface and the second surface is defined as a center plane,
the coarse film layer is an upper coarse film layer formed on the first surface, the first columnar bodies are first upper columnar bodies,
a lower coarse film layer having a void therein is formed on the second surface of the substrate, the lower coarse film layer includes at least a first lower coarse film layer formed on the second surface of the substrate, the first lower coarse film layer is composed of arrayed first lower columnar bodies, each of the first lower columnar bodies is composed of metallic microparticles stacked on the second surface of the substrate and extending in a curve from the second surface of the substrate,
the first lower columnar body and the first upper columnar body are symmetrically curved with respect to the center plane of the substrate,
a winding direction or a folding direction of the electrode foil at a point at which one of the first upper columnar bodies and one of the first lower columnar bodies are formed is identical to an extending direction of the first upper columnar bodies and the first lower columnar bodies,
the dielectric film is formed on both the upper coarse film layer and the lower coarse film layer in a case that the positive electrode foil includes the upper coarse film layer and the lower coarse film layer.

22. A capacitor comprising:
a capacitor element having:
   a positive electrode foil on which a dielectric film is formed;
   a negative electrode foil; and
   a separator interposed between the positive electrode foil and the negative electrode foil;
a negative electrode material with which the capacitor element is impregnated;
a case accommodating the capacitor element therein; and
a sealing unit sealing the case, wherein least one of the positive electrode foil and the negative electrode foil includes a substrate and a coarse film layer having a void therein and formed on the substrate, the coarse film layer includes at least a first coarse film layer formed on the substrate, the first coarse film layer is composed of arrayed first columnar bodies, each of the first columnar bodies is composed of metallic microparticles stacked on a surface of the substrate and extends in a curve from the surface of the substrate, and the dielectric film is formed on the coarse film layer in a case that the positive electrode foil includes the coarse film layer, and the substrate and the coarse film layer mainly contain aluminum, and an alloy containing at least aluminum and zinc is formed in a region immediately below a bonded interface between the substrate and one of the metallic microparticles as an alloy portion, or the alloy is formed inside the surface, on which the coarse film layer is formed, as an alloy layer.

23. The capacitor according to claim 19, wherein the substrate and the coarse film layer mainly contain aluminum, and at least the surface, of the substrate, on which the coarse film layer is formed is made of an aluminum-silicon alloy containing silicon of 3 atomic % to 10 atomic %, inclusive.

* * * * *